Sept. 16, 1969  H. E. TEMPLE  3,466,835
BAKERY PRODUCT HANDLING SYSTEM
Filed Nov. 19, 1965  20 Sheets-Sheet 1
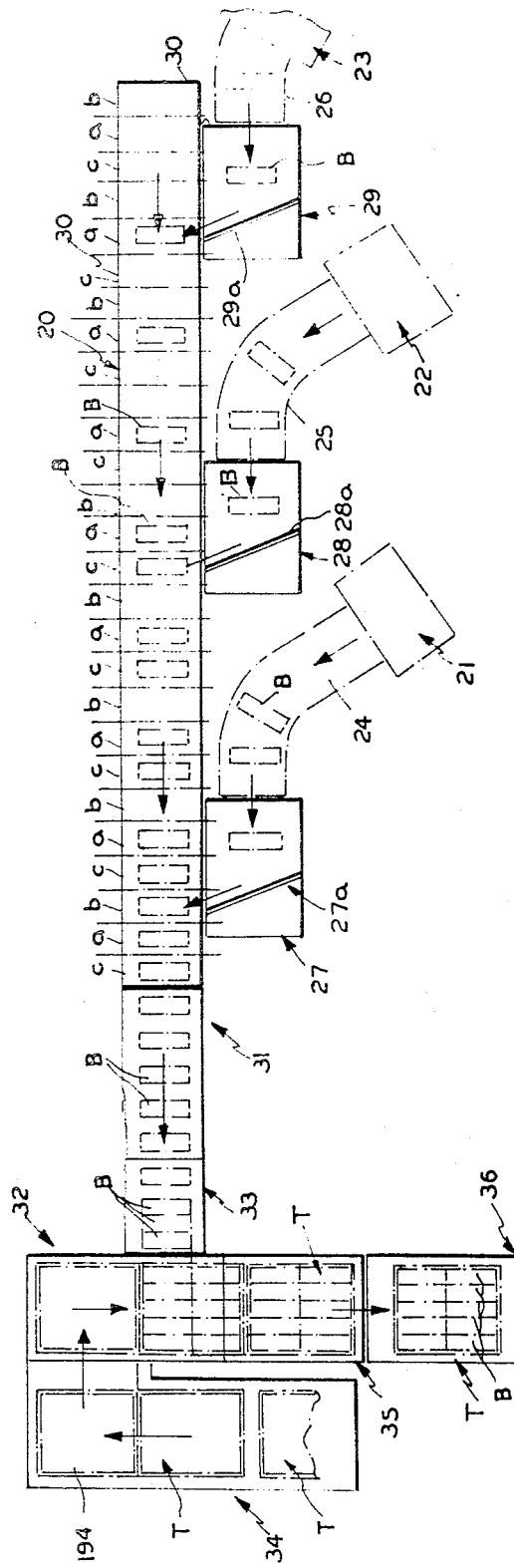
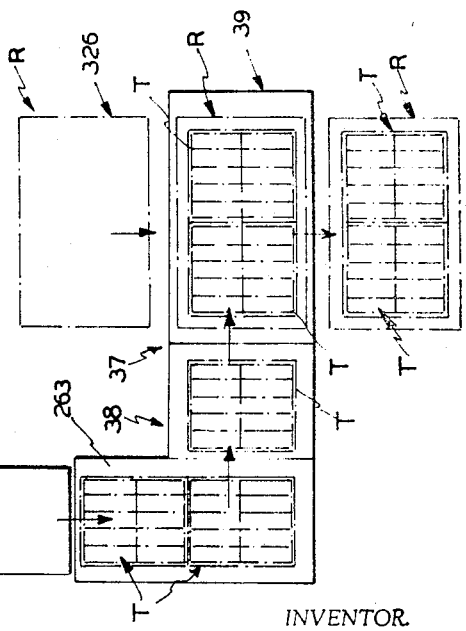
FIG.1
INVENTOR.
HIRAM E. TEMPLE
BY
Learman, Learman & McCulloch
ATTORNEYS Sept. 16, 1969  H. E. TEMPLE  3,466,835
BAKERY PRODUCT HANDLING SYSTEM
Filed Nov. 19, 1965  20 Sheets-Sheet INVENTOR.
HIRAM E. TEMPLE
BY
Learman, Learman & McCulloch
ATTORNEYS Sept. 16, 1969  H. E. TEMPLE  3,466,835
BAKERY PRODUCT HANDLING SYSTEM
Filed Nov. 19, 1965  20 Sheets-Sheet 3

INVENTOR.
HIRAM E. TEMPLE
BY
Learman, Learman & McCulloch
ATTORNEYS

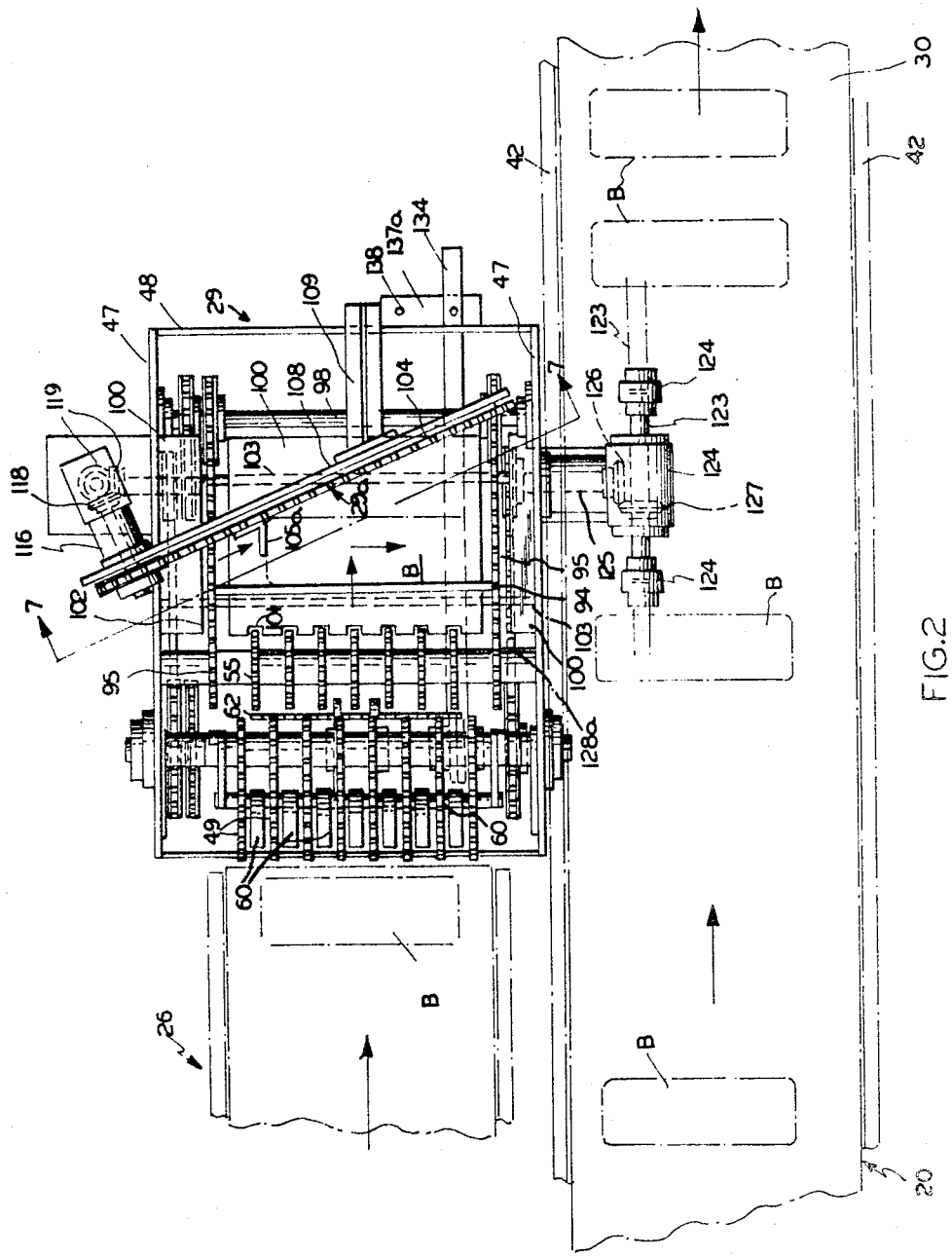

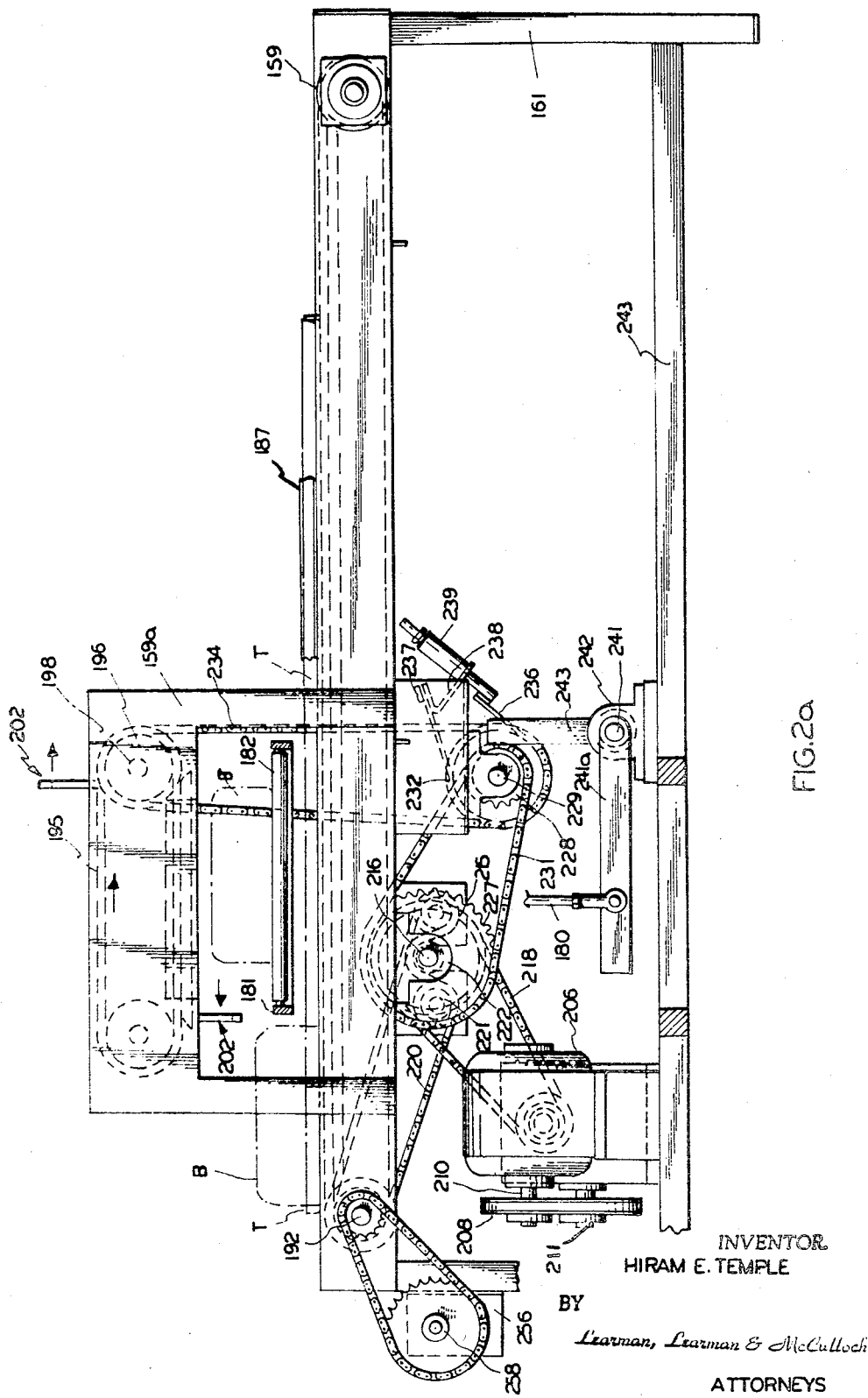

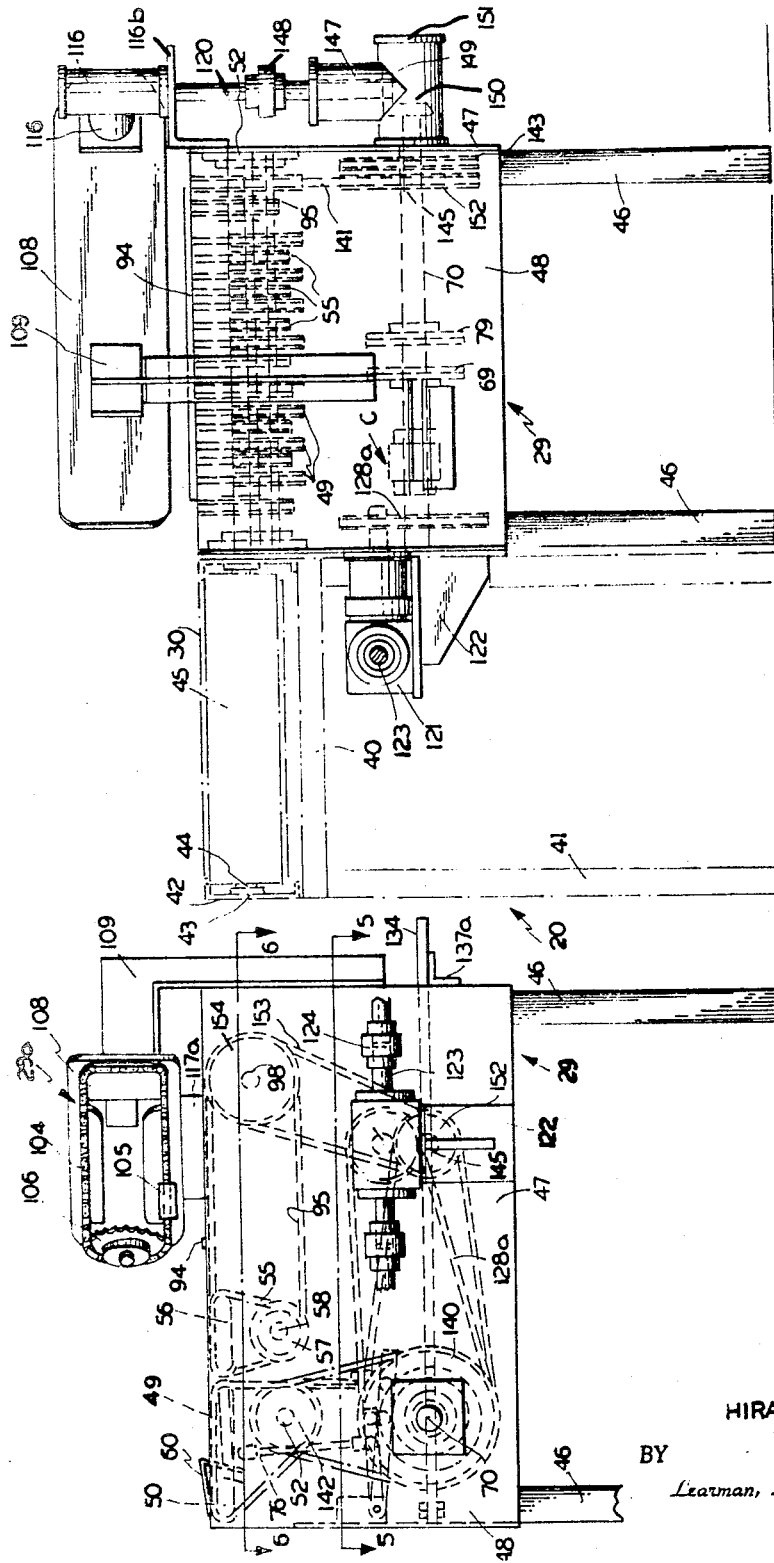

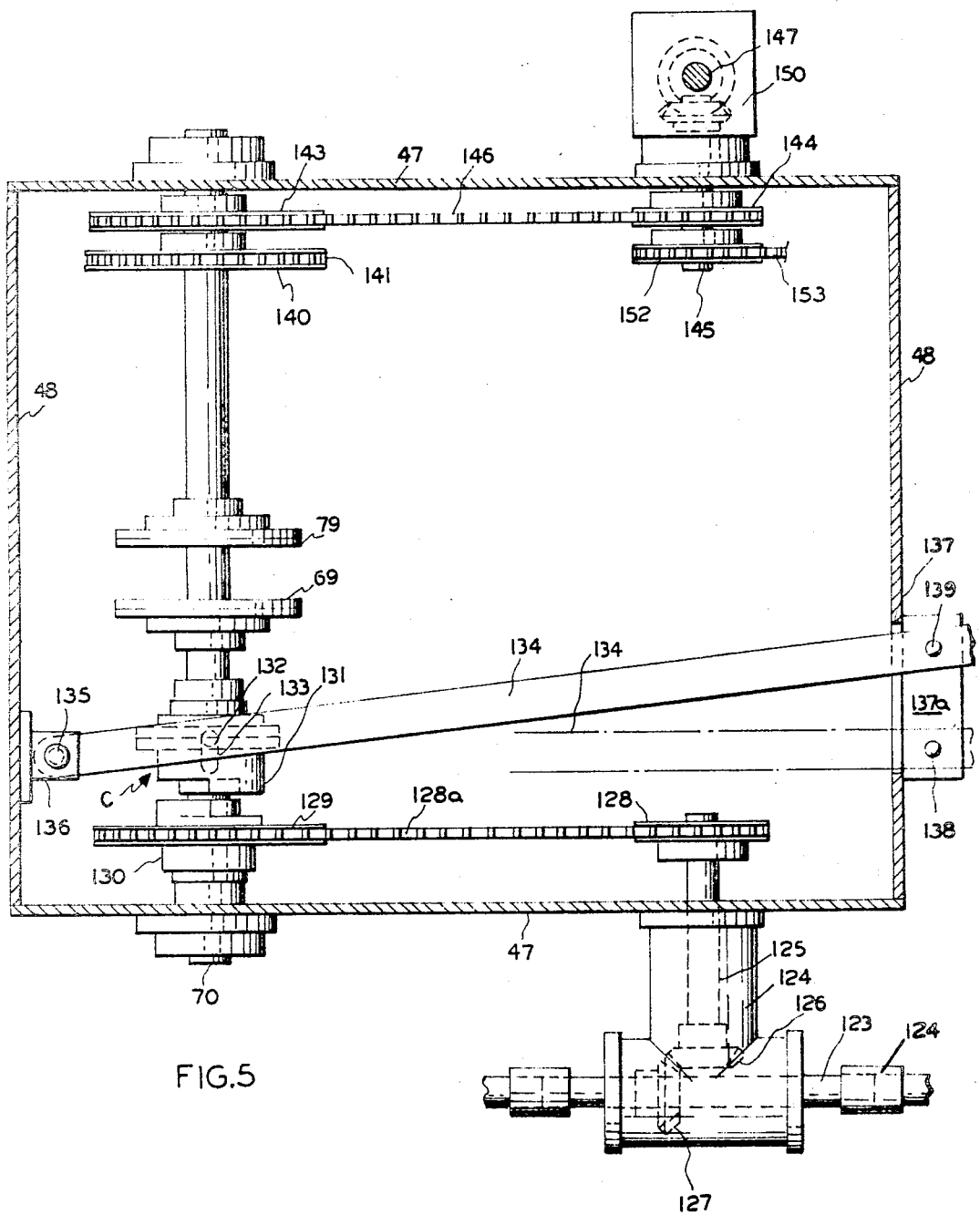

Sept. 16, 1969          H. E. TEMPLE          3,466,835

BAKERY PRODUCT HANDLING SYSTEM

Filed Nov. 19, 1965                        20 Sheets-Sheet 11

INVENTOR
HIRAM E. TEMPLE

BY

ATTORNEYS

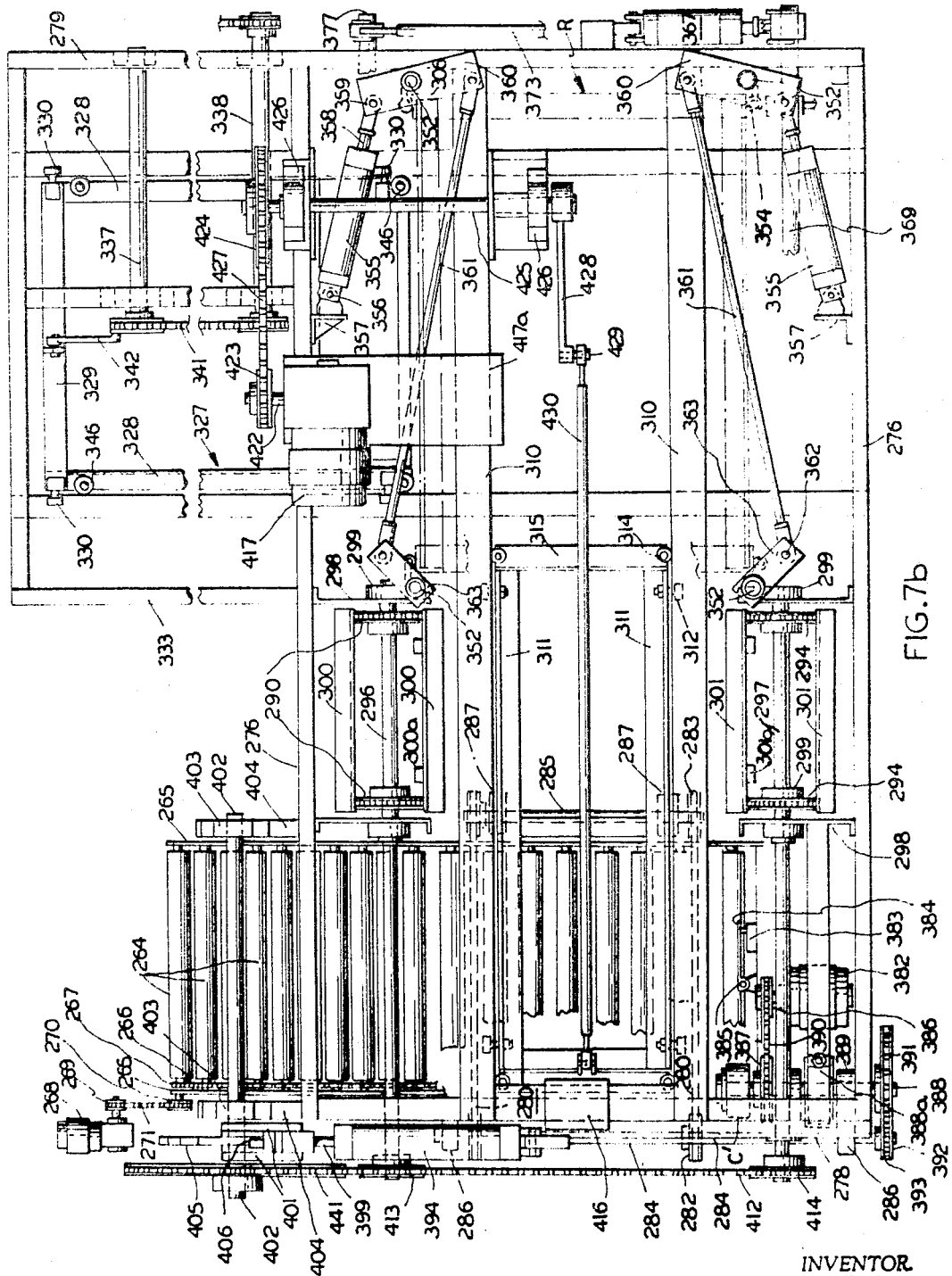

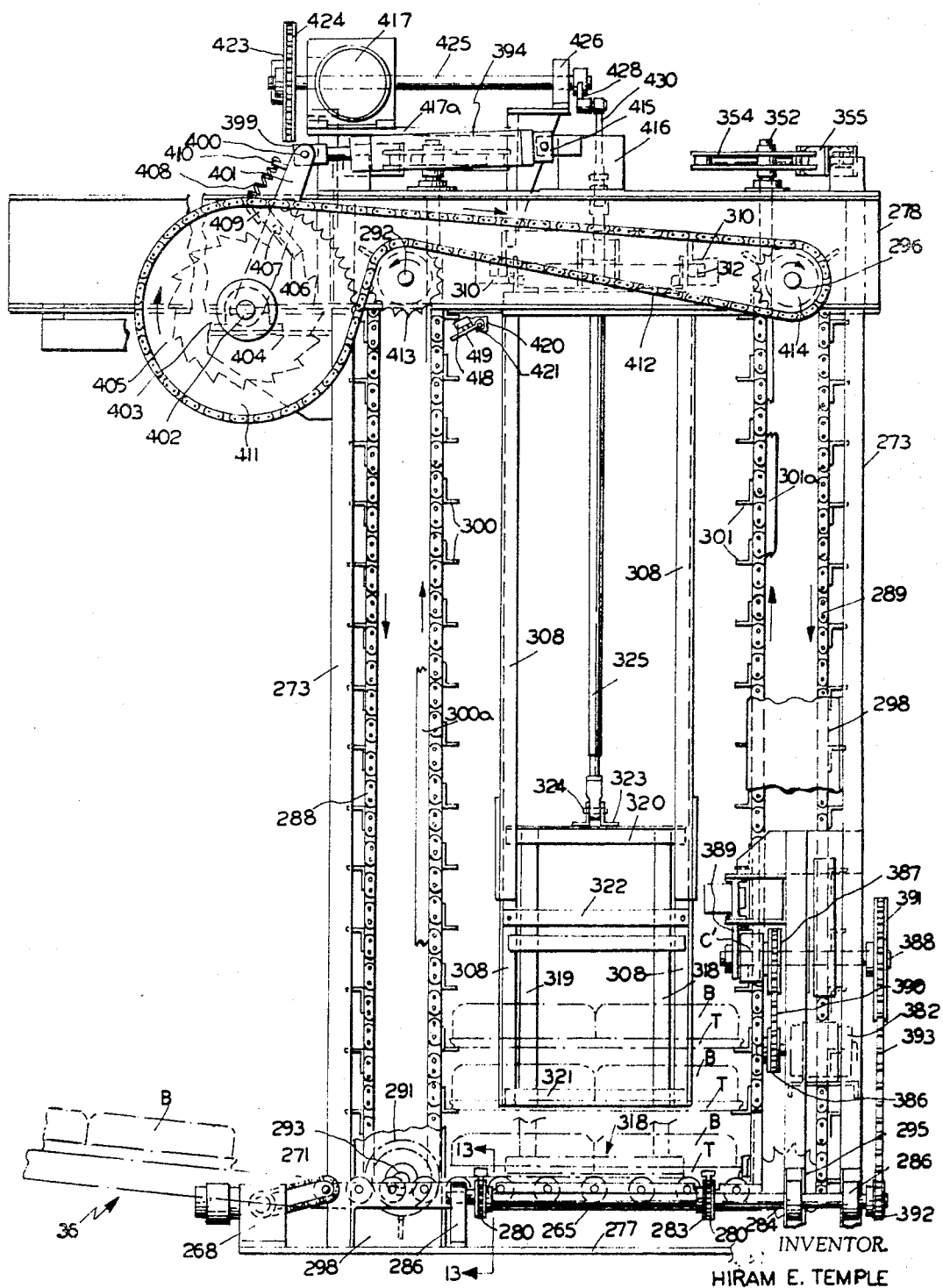

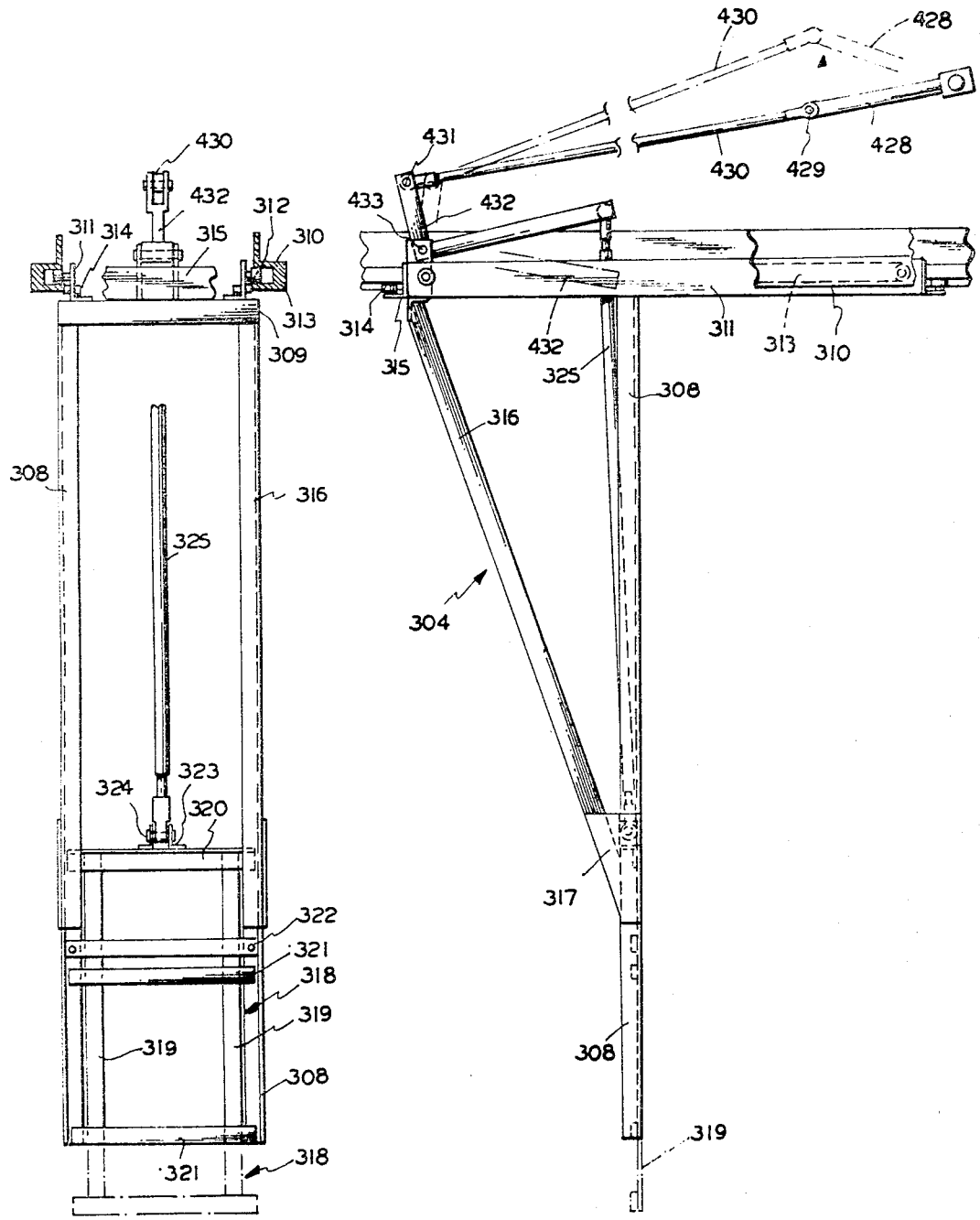

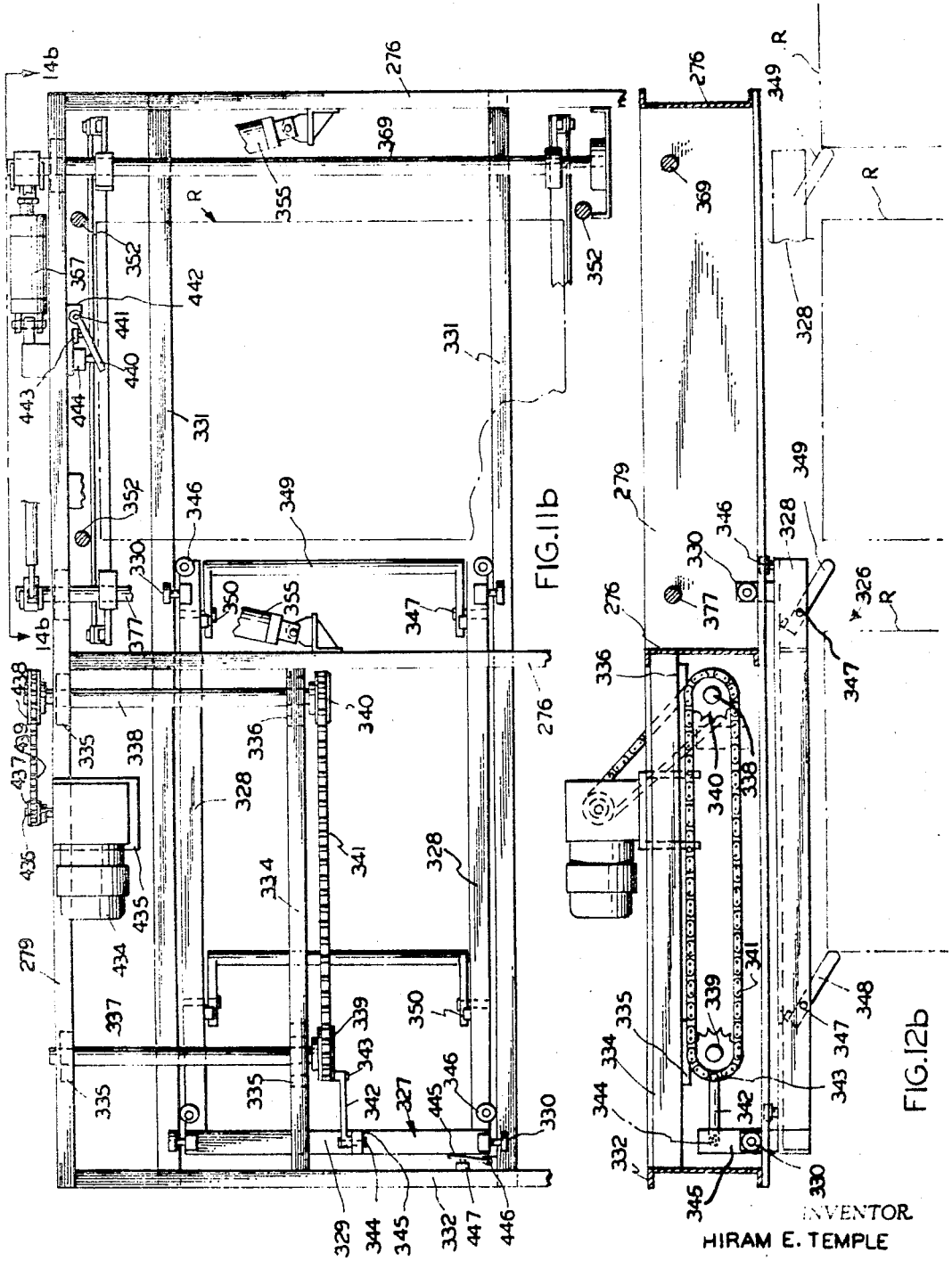

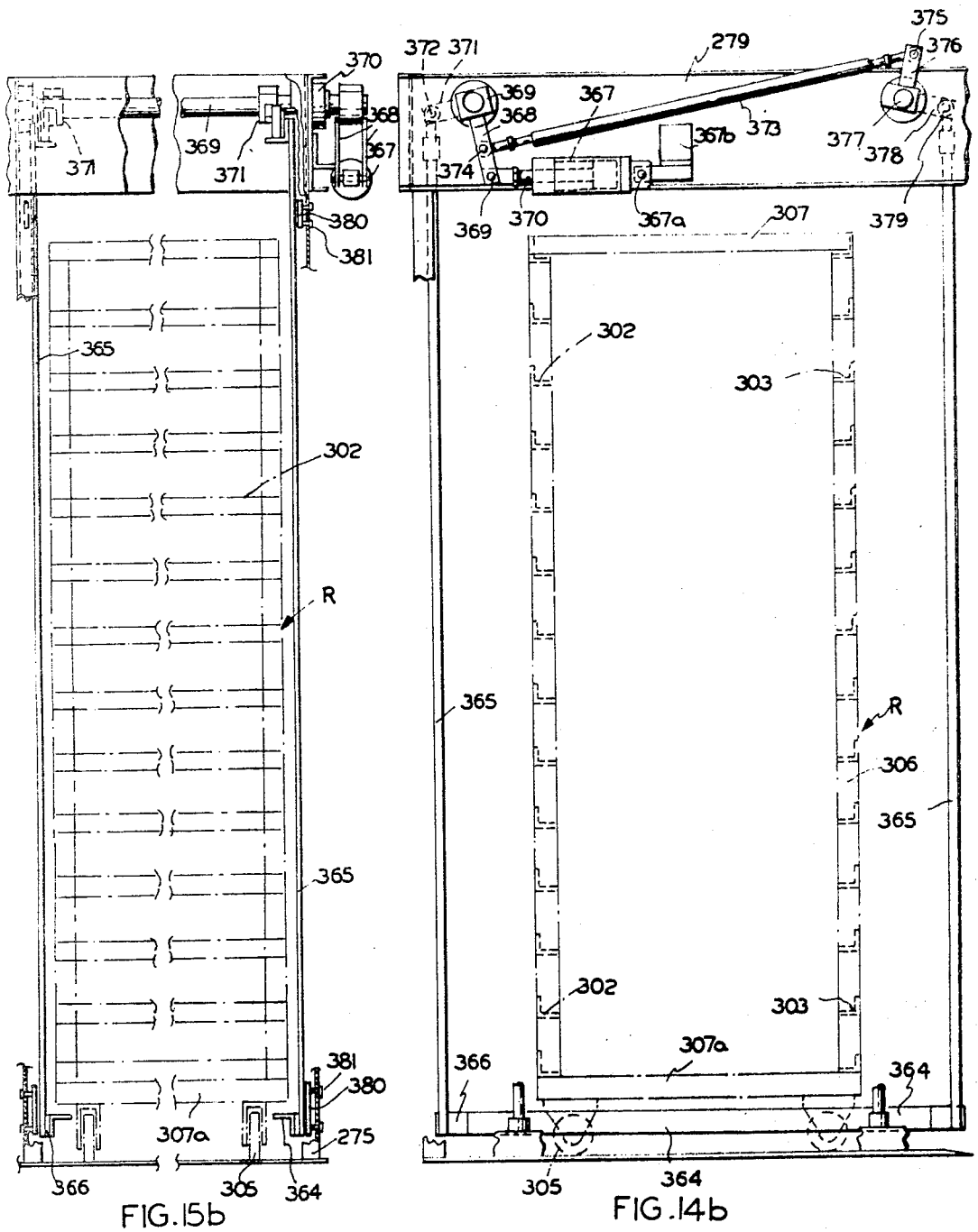

United States Patent Office 3,466,835
Patented Sept. 16, 1969

3,466,835
BAKERY PRODUCT HANDLING SYSTEM
Hiram E. Temple, Saginaw, Mich., assignor to Baker Perkins Inc., Saginaw, Mich., a corporation of New York
Filed Nov. 19, 1965, Ser. No. 508,684
Int. Cl. B65b 35/50, 35/54, 57/10
U.S. Cl. 53—26                                    12 Claims

ABSTRACT OF THE DISCLOSURE

A farinaceous product handling system wherein a battery of transfer units for delivering the product from a group of processing machines such as bread packaging machines is provided adjacent a traveling conveyor, providing a plurality of receiving stations arranged in a line, and receiving products from the units at different ones of the receiving stations along the conveyor; a sweep incorporated with each transfer unit is operable in timed relation with the travel of the conveyor to deliver products to unoccupied stations only; a support surface receives the products and a sweep packs them in a predetermined arrangement in containers; and a stacking unit arranges the containers in vertically supported relation for transport.

---

This invention relates to farinaceous product handling systems and more particularly to high speed automatic palletizing and racking systems for transferring packaged bread and the like from packaging machinery to trays or baskets which can accommodate a plurality of loaves and thence to racks containing a plurality of trays or baskets which may then be loaded on delivery trucks or stored, if desired. In such systems a series of packaging machines must be operated to supply enough bread to keep the palletizing and racking equipment operating at the desired speeds.

One of the prime objects of the invention is to design a completely automatic system for delivering packaged bread from a battery of packaging machines to container loading equipment and thence to rack loading apparatus.

Another object of the invention is to load packaged bread from a series of packaging machines to a single conveyor for supplying the container loading machine which is so coordinated with the packaging machines that bread delivered to the conveyor is always loaded to an empty space thereon.

Still a further object of the invention is to provide a system in which the racks which are loaded with packaged bread in containers are automatically squared up so that their vertically spaced, product receiving shelves are properly aligned prior to receiving products from an elevator system.

Other objects and advantages of the invention will be pointed out specifically or will become apparent from the following description when it is considered in conjunction with the appended claims and the accompanying drawings, in which:

FIGURE 1 is a schematic top plan view illustrating the system and showing the packaged bread loaves proceeding therethrough;

FIGURE 2 is a top plan view of one of the transfer devices for moving bread loaves from a packaging machine to the main conveyor which delivers the loaves to the container loading device;

FIGURE 3 is a left end elevational view of the transfer machine shown in FIGURE 2;

FIGURE 4 is a right end elevational view of the machine shown in FIGURE 2;

FIGURE 5 is an enlarged, sectional top plan view taken on the line 5—5 of FIGURE 3;

FIGURE 2a is a sectional, side elevational view thereof, taken on approximately the line 2a—2a of FIGURE 3;

FIGURE 3a is a right end elevational view of the machine shown in FIGURE 1a;

FIGURE 4a is a sectional top plan view taken on the line 4a—4a of FIGURE 3a;

FIGURE 7b is a top plan view thereof on a slightly enlarged scale;

FIGURE 8b is an end elevational view particularly illustrating the elevator mechanism for loading the rack and the elevator unloading pusher;

FIGURE 9b is a fragmentary, elevational view of the pusher mechanism for moving the loaf carrying trays to the rack being loaded;

FIGURE 10b is a side elevational view thereof, the chain lines indicating the lowered position of the pusher subframe;

FIGURE 11b is a fragmentary, top plan view of carriage mechanism for moving racks into and out of loading position;

FIGURE 12b is a fragmentary, side elevational view thereof;

FIGURE 14b is an enlarged, fragmentary, end elevational view taken on the line 14b—14b of FIGURE 11b, illustrating lift mechanism for vertically aligning the rack shelves with the elevator shelves;

FIGURE 15b is a fragmentary side elevational view thereof; and

Figure 1A:
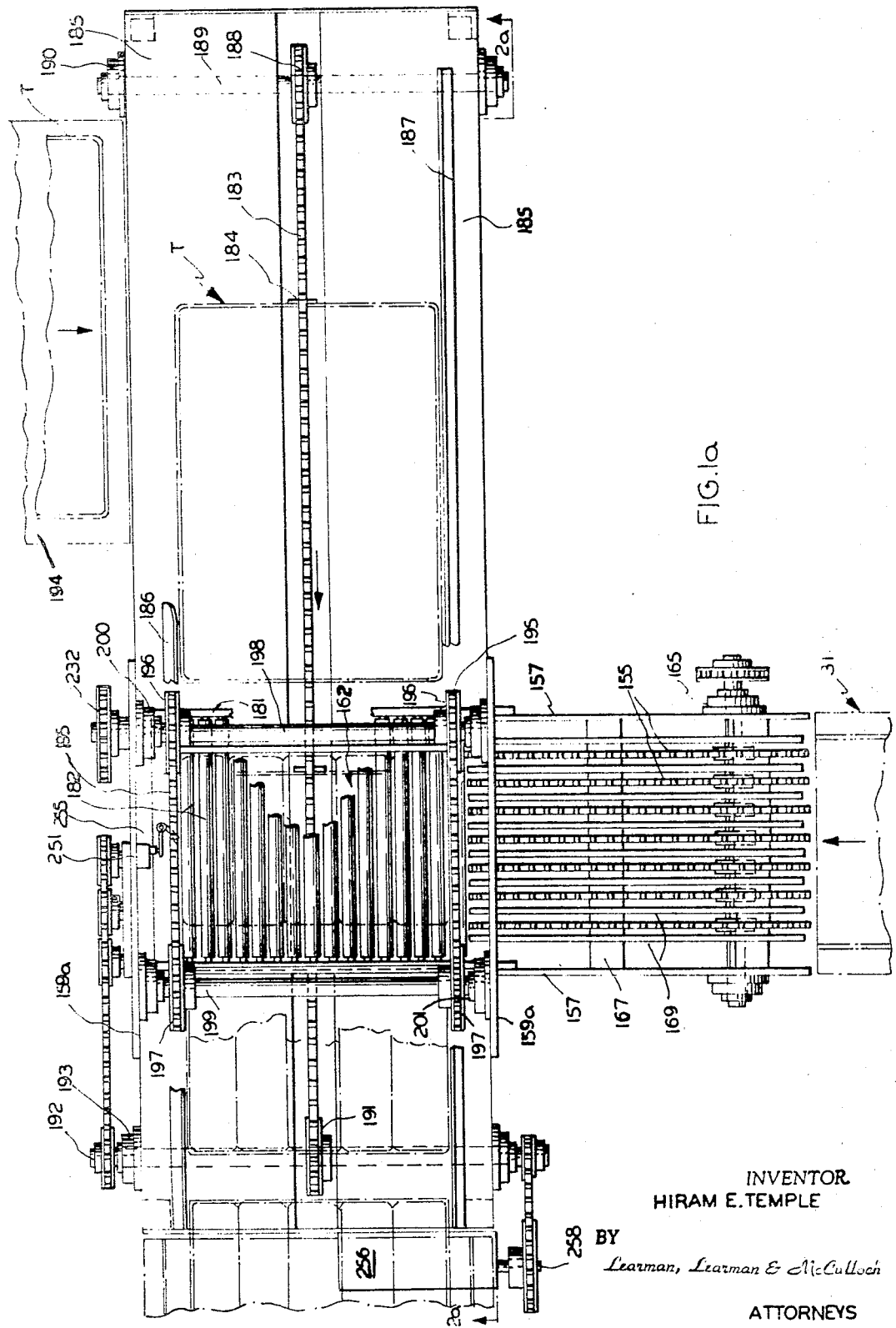
FIGURE 1a is a top plan view illustrating mechanism employed for loading groups of the bread loaves into containers.
Figure 1B:
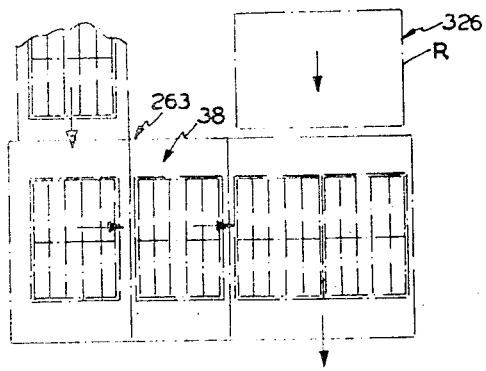
FIGURE 1b is a schematic plan view illustrating the rack loading portion of the operation only.

Referring now more particularly to the accompanying drawings, and in the first instance to FIGURE 1, for a general description of a preferred embodiment of the system only, a main conveyor generally designated 20 is shown as generally bridging or spanning a plurality of packaging machines generally designated 21–23 which have endless, powered discharge conveyors 24–26 leading to loaf depositing and positioning transfer machines generally designated 27–29 which are disposed in a longitudinal row adjacent the longitudinally extending main conveyor 20. In the present instance a trio of wrapping machines and transfer units is illustrated for purposes of convenience, but it is to be understood that more or fewer wrapping machines, or possibly bagging machines, may be utilized to feed individual bread loaves B or other packaged farinaceous products to the endless conveying surface 30 of the conveyor 20.

The conveyor 20 may be considered to be arbitrarily divided into a plurality of stations a–c and the transversely extending chain lines are utilized for convenience sake to illustrate these stations on which bread loaves are to be deposited. While the stations a–c in the embodiment of the invention illustrated herein are to receive single packaged bread loaves disposed crosswise to the longitudinal path of travel of the conveying surface 30, it is to be understood that the surface 30 may be divided into stations sufficiently large enough to accommodate a group of bread loaves with their longitudinal axes disposed in longitudinal parallelism with the surface 30. The transfer machines 27–29 are so correlated with the conveyor 20 that each feeds a bread loaf to one of the stations a–c as the station passes the machine and in this manner each station a–c on the conveyor 20 is provided with a bread loaf. The transfer machine 29, in other words, is operated at a predetermined speed relative to the speed of moving conveyor 20 and is timed to deliver a bread loaf to the spaces a while the conveyors 27 and 28 are respectively delivering bread loaves to the spaces b and c, respectively. Vertically disposed endless flight conveyors generally designated 27a, 28a, and 29a arranged at an angle to the conveying surface 30 convey the bread B in a path which has a longitudinal as well as a transverse component. In this way, bread loaves can be supplied to a conveyor generally designated 31 with all of the spaces a–c occupied and no problems are encountered with loaves being fed to spaces already occupied by other loaves.

The suitably powered endless conveyor 31, which preferably is operated at the same linear speed as conveyor surface 30, supplies a container loading machine generally designated 32 which includes an intake conveyor generally designated 33 and an empty container supplying conveyor generally designated 34. The containers, which in this instance comprise relatively shallow trays T, move on the conveyor 34 in the direction of the arrows to the rear of the container loading apparatus 32, which has a discharge conveyor surface generally designated 35. The containers T are moved forwardly beneath and beyond a platform on which incoming groups of loaves are supported and as the trays T pass beyond the platform the loaves are pushed from the platform and fall to the tray underneath. As shown particularly in FIGURE 1, two groups of five loaves B each are loaded into each tray or container T by the loading device 32 and the loaded trays T proceed from the discharge conveyor 35 to a powered endless conveyor generally designated 36 which delivers them to a rack loading machine generally designated 37.

At the rack loading machine, empty skeleton-like racks generally designated R and comprising essentially corner support posts connected at their upper and lower ends and having therebetween a series of vertically spaced shelves are loaded with the trays T of bread. Each shelf is formed of a pair of horizontally spaced apart angle iron side strips which receive the filled trays T from a tray elevating mechanism generally designated 38. A rack positioning and holding mechanism generally designated 39 is provided to square up the racks R so that their shelf strips are in proper alignment with the similar shelves of the tray elevator apparatus 38. Once the shelves of the racks R have been filled with loaded trays, a pair of trays T being loaded at each level, the wheeled racks R may be simply loaded on a delivery truck.

THE TRANSFER UNITS

Since each of the units 27–29 is identical, a description of one of the units will suffice. As shown particularly in FIGURES 1 and 2, the loaves of bread B are fed to the transfer machines 27–29 crosswise or broadside to the direction of travel in which they proceed from the wrapping machines 21–23. In the present instance, the conveyor 26 and transfer machine 29 will be described for the sake of convenience. The wrapping machine 23 may be considered to be a conventional wrapping machine of the character illustrated, for instance, in the Kilgard et al. United States Patent No. 2,792,677, or the Waite United States Patent No. 3,075,326, or may be a conventional loaf bagging machine such as the Mark 50 manufactured by Commodity Packaging Company, Inc., of Yakima, Washington, U.S.A. The conveyor 26 which delivers the packaged bread from the machines 23 may comprise a conventional gravity roll conveyor or could be a powered conveyor of the powered roll or endless surface type. Likewise, the powered conveyor 20 to which the machine 29 delivers the bread may comprise an endless rod type conveyor or endless belt type conveyor of conventional character.

In FIGURE 4 the conveyor 20 is disclosed as comprising longitudinally spaced horizontal supports 40 mounted on longitudinally spaced legs 41, the supports 40 mounting side rails 42 having bearings 43 journaling the shafts 44 of the end rollers 45 around which the endless support surface 30 is trained. As will later be described in detail, the conveyor 20 and transfer machines 27–29 are driven by the same motor, so that no problems of synchronization arise.

Figure 6:
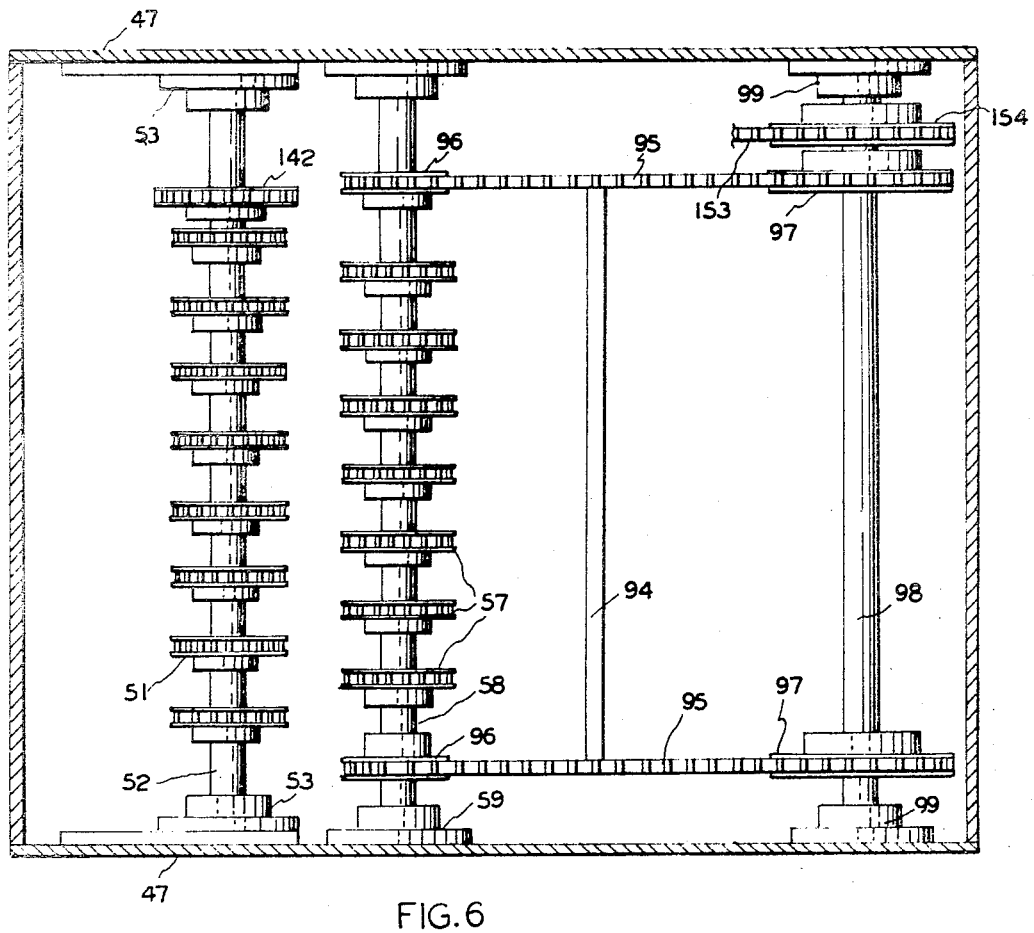
FIGURE 6 is an enlarged, sectional top plan view taken on the line 6—6 of FIGURE 3.

As shown particularly in FIGURES 2–4, the transfer unit 29 comprises rectangularly arranged corner legs 46 for supporting side plate members 47 and front and rear end plate members 48 which form a box-like frame open at its upper and lower ends. Supported between the side frames 47 in transversely spaced apart relation adjacent the rear end of the machine are a series of endless conveyor chains 49 trained around upper guide members 50 and around lower sprockets 51 (see FIGURES 6 and 11) which are mounted in transversely spaced apart relation on a shaft 52 journaled in bearings 53 on the side walls 47. The chains 49 receive the bread loaves B from the conveyor 26 and, when permitted to do so, convey the bread loaves B forwardly toward the transversely inclined delivery conveyor generally designated 29a in FIGURE 2 which transfers them to the main conveyor 20.

Forwardly of the conveyor chains 49 in the path of travel of the bread loaves B are a further series of transversely spaced endless conveyor chains 55 which are trained around upper guides 56 and around sprockets 57 fixed on a shaft 58 mounted in bearings 59 on the side walls 47. The chains 55 which receive the bread loaves B from the chains 49, when permitted to do so, are disposed out of longitudinal alignment with the chains 49 in positions generally intermediate chains 49.

Figure 11:
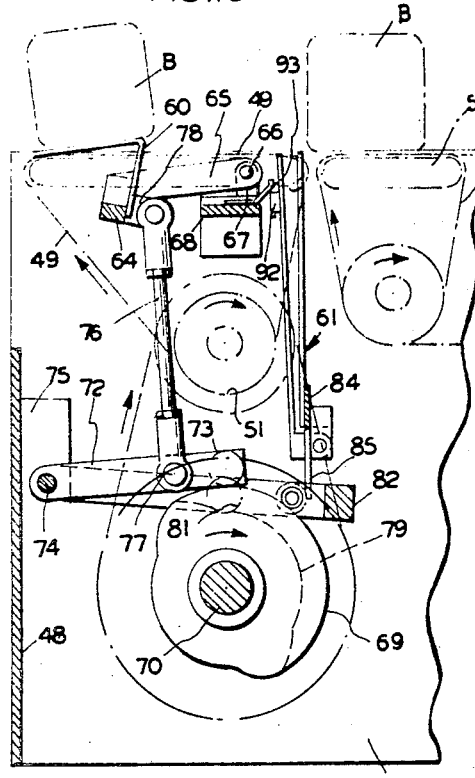
FIGURE 11 is a fragmentary, transverse sectional view taken on the line 11—11 of FIGURE 10 and showing the mechanism in one position.
Figure 12:
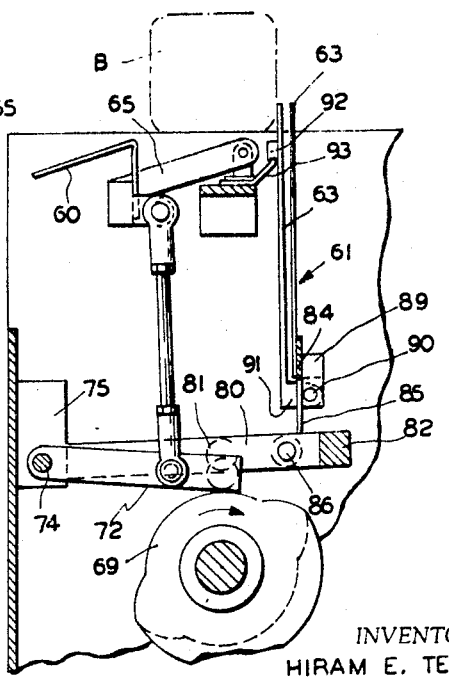
FIGURE 12 is a similar view, showing the mechanism in still another operating position.

A series of angularly shaped elevator bars 60 are provided between the chains 49 and are mounted so as to be movable from the "down" position in which they are shown in FIGURE 12, and in which they do not interfere with the travel of a bread loaf B on the chains 49, to a raised position in which, as shown in FIGURE 11, they raise the bread loaf B sufficiently so that it is not in engagement with the chains 49 and is not carried forwardly by them.

A stop arm assembly generally designated 61 is provided between the chains 49, just forwardly of the second series of chains 55. This stop mechanism 61, which is illustrated particularly in FIGURE 13 and will later be described in detail, includes laterally outer stop finger elements 62 and a more centrally located stop finger element 63.

Figure 10:
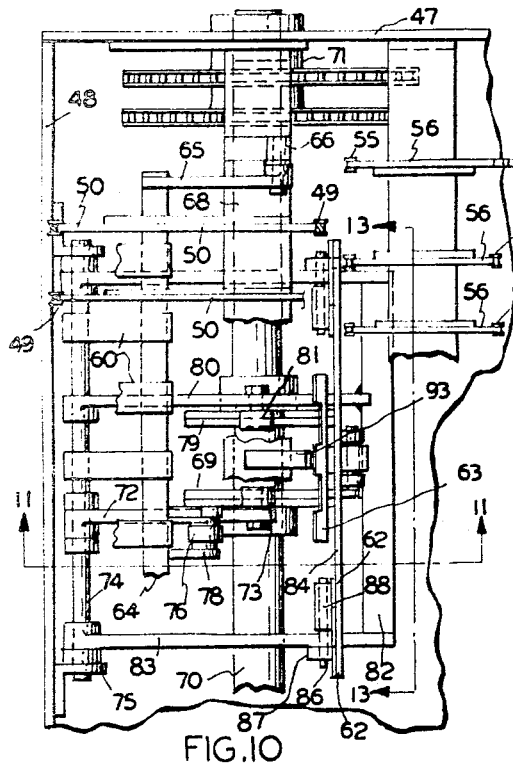
FIGURE 10 is an enlarged, fragmentary, top plan view illustrating mechanism for insuring the proper delivery of the packaged bread loaves received by the transfer machine.

As shown particularly in FIGURES 10-12, the elevator bars 60 are mounted on a cross bar 64. At its ends the cross bar 64 is fixed to lever arms 65 which are pivotally mounted on pins or shafts 66 journaled in bearings 67 provided on a cross bar 68 spanning the side walls 47. A cam 69 mounted on a cam shaft 70 which is journaled in bearings 71 provided on the side frame members 47 is responsible for moving the elevator members 60 to raised position and permitting them to fall under the influence of the forces of gravity to a lowered position. Mounting a follower roller 73 which engages cam 69 is a cam follower arm 72 which is pivotally supported on a rod 74 as shown, the rod 74 being supported on the adjacent end wall 48 by brackets 75. A connecting rod 76 pivotally connected to the follower arm 72 at 77 and to clevis elements 78 extending from the elevator member cross support 64 moves the elevator support levers 65 upwardly under the influence of the cam 69.

Mounted on the cam shaft 70 is a second cam 79 which controls the stop finger assembly 61 through a second follower arm 80 which is similarly pivoted on the rod 74 and has a follower roller 81 in engagement with the cam 79. As shown in FIGURES 10-12, the stop finger assembly 61 is supported on a cam follower frame comprising a cross member 82 to which follower arm 80 is joined, the frame also including side bars 83 which are pivotally connected to the rod 74. A cross bar 84, to which the finger elements 62 are fixed, has dependent legs 85 connected to the cam follower frame side bars 83 by pins 86, the legs 85 having portions 87 and 88 which receive pins 86. As shown in FIGURES 12 and 13, the middle stop finger element 63 is pivotally mounted as at 89 on the stop assembly 61, there being clevis elements 90 fixed to the bar 84 for receiving the pin 89 which is mounted in a bearing 91 on the stop finger element 63.

Mounted on the pivotal stop finger element 63 which, as shown in FIGURES 11 and 12, leads the nonpivotally mounted outer stop finger elements 62 in the sense that it is first engaged by a bread loaf B, is an L-shaped latch member 92 adapted to engage over a latch finger 93 mounted on cross bar 68. As will later become apparent when the operation of the transfer unit 29 is described in detail, the latch 92 is released only when a loaf of bread B pushes the finger element 63 forwardly after the cam 79 has raised the latch 92 sufficiently to clear the latch finger 93. If no loaf of bread B is present to move the stop finger element 63 and latch 92 forwardly, latch 92 will simply drop back again to latched position when permitted to do so by cam 79.

From the conveyor chains 55 a loaf of bread B moves into the path of a longitudinally moving transversely disposed transfer bar 94 mounted for endless travel by a pair of endless chains 95 trained around end sprockets 96 on the shaft 58 and around sprockets 97 on a shaft 98 which is journaled in bearings 99 provided near the front ends of the side plate members 47. The sweep bar 94 travels across a support surface 100 which leads to and beyond the delivery conveyor 54, and it will be noted that the rear edge of support surface 100 is notched as at 101 to pass the front ends of chains 55 and that the support surface structure is divided as at 102 to pass the chain 95. The side portions of support surface 100 (see FIGURE 2) are connected with the middle portion thereof by transverse support braces 103.

The delivery conveyor 54 which cooperates with the sweep bar 94 to move the loaves B to the conveyor 20 comprises an obliquely extending, vertically disposed endless chain 104 on which is mounted an angular pusher element 105 (see FIGURES 2, 3, and 7–9) having a longitudinally extending pusher bar 105a (see FIGURE 2). The chain 104 is trained around a sprocket 106 which is fixed on a stub shaft 107 journaled on the conveyor supporting plate 108. Plate 108 is mounted on a bracket 109 secured to the front end plate 48, the plate 108 being adjustably secured to bracket 109 by bolts 110 extending through elongated slots 111 provided in the support 108. The chain 104 is also trained around upper and lower guides 112 and 113, respectively, and an end guide 114, all of which are secured to the vertical support plate 108. An intermediate support plate 115 secures to the plate 108 and carries end guide 114. Mounted on the end of shaft 107, which extends through one portion of an elbow housing 116 bolted as at 117 to the plate 108 and on into the vertical portion of the elbow 116, is a bevel gear 118 which meshes with a mating bevel gear 119 on the upper end of a drive shaft 120. The lower end of elbow housing 116 is bolted as at 116a to a bracket 116b mounted on side plate 47. The manner in which shaft 120 is driven will presently be made clear.

Journaled in bearings 121 (see FIGURES 3 and 4) provided on gusseted support brackets 122 on a side plate 47 of each of the transfer machines is a main drive shaft 123 which may be directly connected to an electric motor 123a (see FIGURE 16b) through a conventional Reeves variable speed device or the like (not shown). The various sections of the main shaft 123 may be connected by couplings 124 (see FIGURE 2), and it is to be understood that the shaft 123 drives not only the conveyor 20 but also each element of the transfer units 27–29. A T-shaped housing 124 (see FIGURE 5) is provided on a side wall 47 to house a takeoff shaft 125 having a bevel gear 126 in mesh with a bevel gear 127 provided on the shaft 123.

Mounted on the inner end of shaft 125 is a sprocket 128 which is connected with a sprocket 129 fixed on one jaw 130 of a clutch C, the clutch jaw 130 being journaled on shaft 70 and adapted to mesh with a mating clutch jaw 131 which is mounted for axial sliding movement on the shaft 70 by a pin 132 received in an axial slot 133 provided in the shaft 70 so that the clutch jaw 131 is axially slideable but rotatably fixed to the shaft 70. A level arm 134 which may be connected to the clutch jaw 131 by the pin 132 is pivotally connected as at 135 to a bracket 136 provided on the one end wall 48 and at its opposite end extends out an opening 137 provided in the front end wall 48 and may be moved from the position in which it is shown in solid lines in FIGURE 5 to the position in which it is shown in diagrammatic lines in FIGURE 5 to mesh the jaw 131 with the jaw 130 and drive shaft 70. Provided on the front end wall 48 is a bracket 137a which supports the outer end of lever 134 and may include openings 138 for receiving a pin 139 on the lever arm 134 and so anchor the lever arm 134 in a position in which it either engages or disengages the clutch jaws 130 and 131.

The shaft 70 of each of the units 27–29 functions as a main drive shaft for the unit and, as shown particularly in FIGURES 3 and 5, drives the shaft 52 through a sprocket 140 which is connected to the shaft 52 by means of a chain 141 trained around the sprocket 140 and around a sprocket 142 provided on the shaft 52. Also mounted on the shaft 70 is a sprocket 143 which drives a sprocket 144 provided on a stub shaft 145 by means of a chain 146. It is the shaft 145 which drives the shaft 120 powering the obliquely disposed delivery conveyor 54, through a shaft 147 which is coupled to the shaft 120 as at 148. Provided on the lower end of shaft 147 is a bevel gear 149 which meshes with a bevel gear 150 provided on the shaft 145, a T-shaped housing 151 bolted to side plate 47 being provided to house the elements, as shown particularly in FIGURE 4. Also mounted on shaft 145 is a sprocket 152 which drives shaft 98 through a chain 153 and a sprocket 154 fixed on shaft 98.

In the operation of transfer unit 29, a bread loaf B from conveyor 26 is moved forwardly by the chains 49 when the elevator elements 60 are in lowered position, as shown in FIGURE 12. The loaf B will be stopped initially by the central finger element 63 until the cam element 79 raises follower arm 80 to remove the latch 92 from the latch finger 93, and thereafter the central finger element 63 will be moved forwardly about pivot pin 89 by the pressure of the bread loaf B which is in engagement with chains 49, until the outer stop elements 62 are engaged. By engaging the central stop element 63 first of all, bread loaves B which may be skewed relative to the longitudinal path of travel tend to be squared up so that their longitudinal axis is perpendicular to the longitudinal path of the conveyor elements 49 and 55. As soon as the cam 79 permits, the stop elements 62 and 63 lower and the bread loaf B is advanced by the conveyor chains 55 into the path of the sweep bar 94.

As shown particularly in FIGURE 2, the bread loaf B is moved forwardly by the sweep bar 94 to a position adjacent the delivery conveyor 54, and precisely at the time it reaches the position in which the forwardmost loaf B is shown in FIGURE 2, the end of the loaf is engaged by the pusher arm 105a, the speeds of sweep bar 94 and pusher arm 105a being so coordinated that the bread is then moved forwardly and laterally at the same time to a station a on conveyor 20. By this time a second loaf B has been held up temporarily by the raised elevator elements 60 and then proceeded along the chains 49 into position to be halted by the stop assembly 61. The cam 69 is so configured that the elevator elements 60 prevent a third loaf from proceeding with the second loaf when the stop assembly 61 is lowered. As will be apparent from an inspection of the cam 79, the stop gate assembly 61 is only in raised position for a short period of time which is just sufficient to assure that the preceding loaf has cleared conveyor elements 55 before the next loaf B is released. Because the latch 92 will not be released, regardless of cam 79, if no bread loaf B is positioned against finger element 63, bread loaves B cannot pass beyond the conveyor chains 49 out of time.

As noted previously and shown particularly in FIGURE 1, the endless surface 30 of the main conveyor belt 20 is divided into imaginary stations a–c of equal longitudinal extent in the direction of movement of the bread loaves B and the transfer unit 29 feeds bread loaves only to the spaces a, the transfer machine 28 feeds bread loaves only to the spaces C, and the transfer unit 27 feeds bread loaves B only to the spaces b. This is possible because the units 27–29 are driven in timed relation with the main conveyor unit 20 and because the timing is controlled by the latch 92, regardless of the random manner in which the packaging machines may supply loaves of bread B to the transfer units 27–29. Each delivery is controlled by the requirement that there be a bread loaf B in position against the stop element 63, as well as the requirement that the cam 79 be in a position to raise the stop assembly 61 in order for the latch 92 to release. Thus, at the time that cam 79 would otherwise permit release of the latch 92, a bread loaf B which was not in time in the sense that it had not quite yet reached the stop element 63 would not cause the release of latch 92 and such a bread loaf would not be released until the next time the cam 79 was again in a proper position.

THE CONTAINER LOADING MECHANISM

From the endless conveyor 31 which is powered by a conventional electric motor 31a (FIGURE 16b) the bread loaves B move to the intake conveyor 33 of container loading machine 32 and a series of transversely spaced, endless conveyor chains 155 which are supported on a frame comprising support legs 156 which support side plate members 157 and end rail members 158 and 158a. As shown particularly in FIGURE 4a, the side plates 157 and front plate 158 form a box-like frame which secures at its front end to another box-like frame extending at right angles to the side plates 157 and comprising side plates 159 joined by end plates 160 and supported by legs 161. Header side plates 159a are also provided. The conveying chains 155 which move the bread loaves B forwardly to a roller conveyor platform generally designated 162 are trained around sprockets 163 fixed on a shaft 164 journaled in bearings 165 provided on the side plates 157. Also provided for supporting the chains 155 are elongate chain guides 166 which, as shown in FIGURE 5a, may be supported from the side plates 157 by cross braces 167 connected with supports 168 which mount the guide members 166.

Figure 5B:
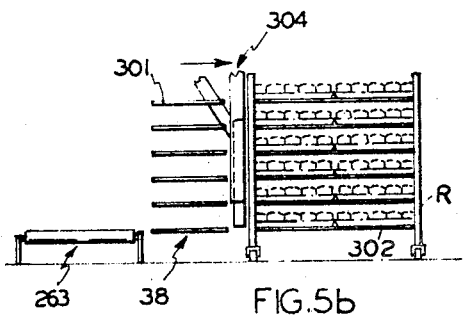
FIGURE 5b illustrates the manner in which the additional container is then transferred from the elevator to the rack.
Figure 5A:
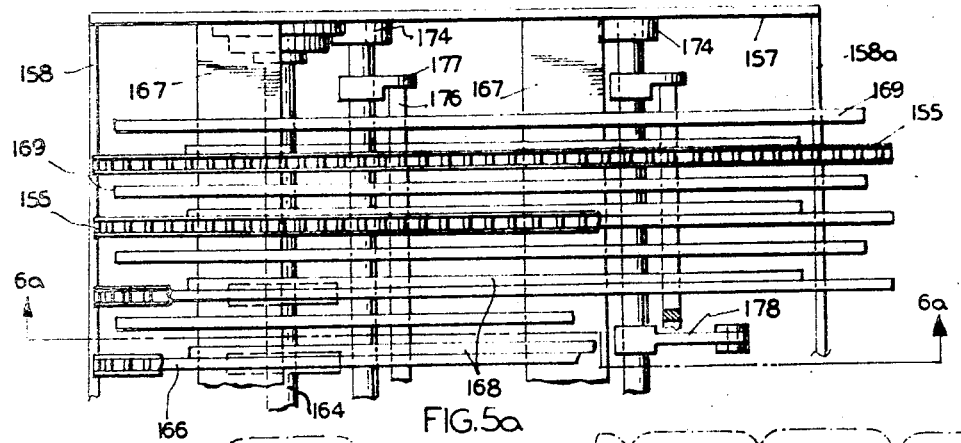
FIGURE 5a is an enlarged, fragmentary top plan view illustrating elevator bar mechanism for holding loaves supplied out of engagement with the advancing conveyor chains.
Figure 7A:
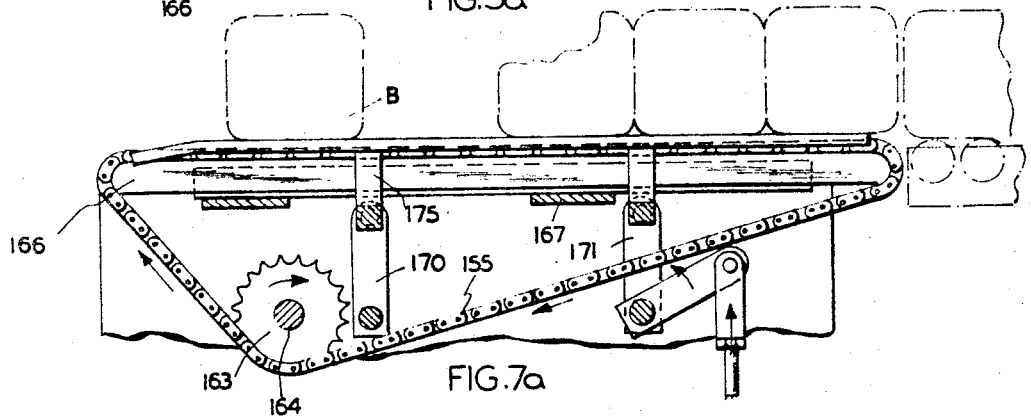
FIGURE 7a is a similar view, showing the elevator bar mechanism in lowered position.
Figure 6A:
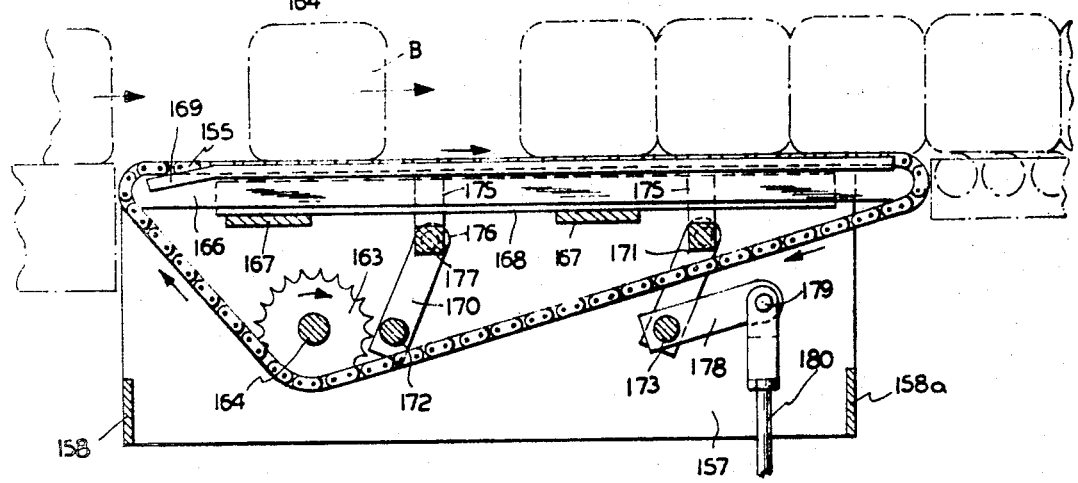
FIGURE 6a is a transverse, sectional view taken on the line 6a—6a of FIGURE 5a and showing the elevator bar mechanism in raised position.

Disposed between the chains 155 are elongate, longitudinally disposed elevator bars 169 which are movable from the lowered position in which they are shown in FIGURE 6a, and in which their upper surface is disposed slightly below the upper surface of chains 155, to the raised position in which they are shown in FIGURE 7a in which they raise the bread loaves B to a position out of engagement with the chains 155. As shown in FIGURES 5a–7a particularly, links 170 and 171 mounted on shafts 172 and 173 journaled in bearings 174 provided on side walls 157 mount the elevator bars 169 for movement upwardly and downwardly. Dependent lugs 175 extend from the bars 169 to join to cross bars 176 having trunnion ends 177 pivotally received by the links 170 and 171. Rigidly connected to the shaft 173 to revolve it sufficiently to swing the links 170 and 171 upwardly is a crank arm 178 which is pivotally joined as at 179 to a connecting rod 180, the rod 180 being driven in timed relation with the other elements of the container loading machine in a manner which will be later described.

Figure 3B:
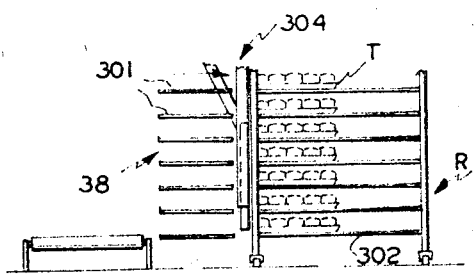
FIGURE 3b illustrates the manner in which the bread loaves are then transferred from the elevator to a typical rack.
Figure 3A:
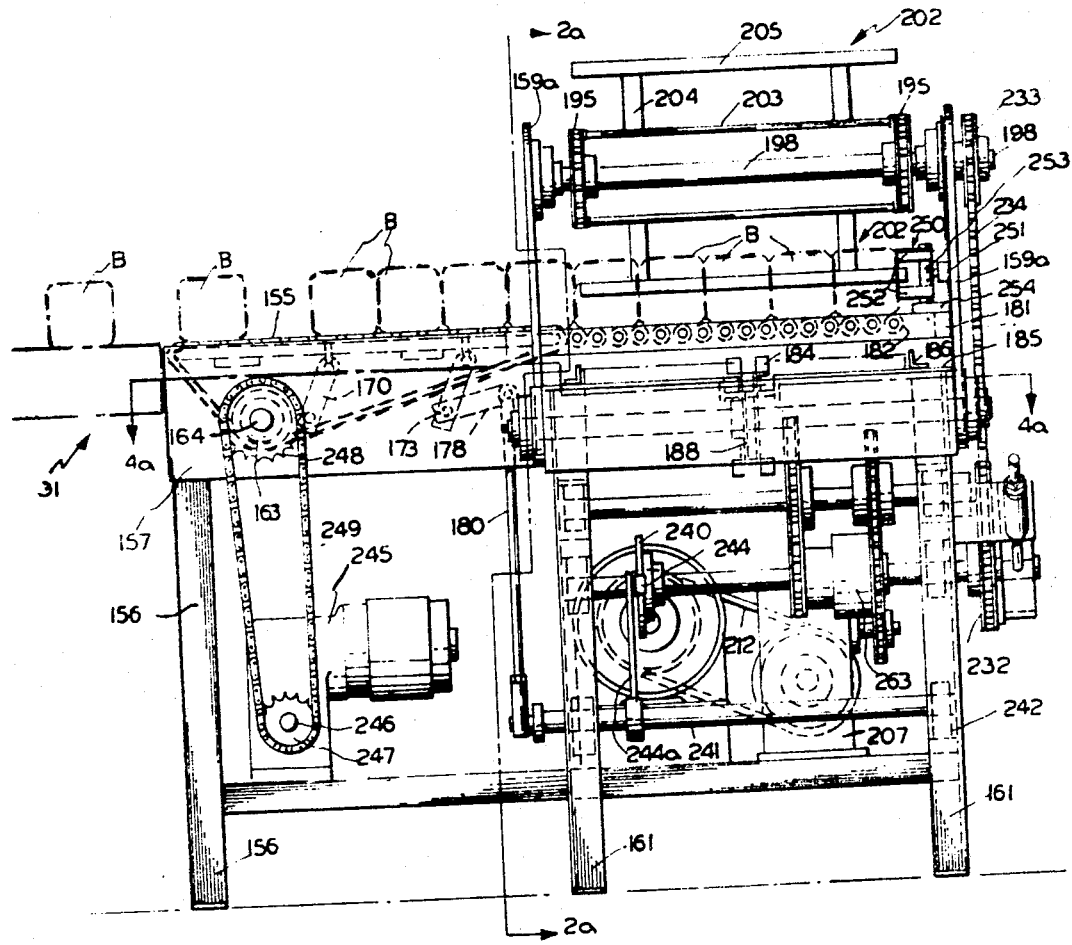

The roller assembly 162 to which the bread loaves B are delivered in groups of five, as shown in FIGURE 3a, includes side rails 181 spanning the side plates 159 and so journaling the rollers 182, which extend perpendicularly to the chains 155, that their upper surfaces are disposed on the level of the upper surfaces of chains 155. While groups of five loaves are shown as being loaded into the containers or trays T in the drawings, it is to be understood that the groups could comprise a fewer or greater number of loaves. Empty trays or containers T are moved forwardly under and beyond the roller assembly 162 by a chain conveyor 183 having flights 184 which extend upwardly above container support plate surfaces 185. The support plates 185 which, as shown in FIGURE 3a, are mounted by the side plates 159 a spaced distance below the rollers 182 are spaced apart to permit the flights 184 to extend up between them and push the containers T forwardly. Provided on the plates 185 are guides 186 and 187 which properly align the trays T so that when they pass beyond the rollers 182 they will be in proper position to receive the bread loaves B which are swept downwardly from the rollers 182 to the containers T in a manner which will be described. The chain 183 is trained around a rear sprocket 188 fixed on a shaft 189 which is journaled in bearings 190 on the side plates 159 and around a front sprocket 191 fixed on a drive shaft 192 journaled in bearings 193 also provided on the side plates 159.

As shown in FIGURE 1a, when a particular tray T has moved forwardly so that its rear end is substantially adjacent the one guide 186, another tray T is fed downwardly into place from a conveyor 194 leading to the support surface 185. The conveyor 194 is preferably a conventional gravity roll conveyor which extends from a container storage area.

Mounted above the roller conveyor assembly 162 is a sweep assembly which includes a pair of endless chains 195 trained around sprockets 196 at one end and 197 at the other, the sprockets 196 and 197 being fixed to shifts 198 and 199, respectively, journaled in bearings 200 and 201, respectively, provided on the side walls 159a. Spanning the chains 195, as shown in FIGURE 3a, is a sweep assembly generally designated 202 comprising a rod 203 connected with the links of chains 195, radial supports 204 and a sweep bar 205. As FIGURE 2a shows, a pair of such sweep bar assemblies 202 are provided so that two groups of five loaves each may be loaded into a single tray T.

A motor 206 is utilized to drive both the sweep chains 195 and tray conveying chain 183 in synchronism through a speed reducer 207, there being sheaves 208 and 209 on the output shaft 210 of motor 206 and input shaft 211 of gear box 207 connected by a belt 212. The output shaft 213 of reducer 207 mounts a sprocket 214 which is connected with a sprocket 215 on a drive shaft 216 journaled in bearings 217 on the side plates 159 by means of a chain 218. A drive sprocket 218a is provided on the end of shaft 216 and is connected with a sprocket 219 provided on shaft 192 by a chain 220, the chain 220 also being trained around idler sprockets 221 and 222 mounted on stub shafts 223 and 224, respectively, which are journaled in bearings 225 and 226, respectively, provided on the one side wall member 159. Drive shaft 216 also mounts a drive sprocket 227 which is connected with a sprocket 228 on a shaft 229 mounted in bearings 230 on side rails 159 by a chain 231. Mounted on the outboard end of shaft 229 is a sprocket 232 which is connected with a sprocket 233 on the shaft 198 driving sweep chains 195 by a chain 234. A solenoid actuated single revolution clutch 263 is provided on shaft 229 and a brake drum 235 may also be provided on the shaft 229 outboard of the sprocket 232 to accommodate a band brake member 236 which is coupled as at 237 to a bracket 238. A spring cylinder 239 is connected with the other end of the brake band 236, as shown in FIGURE 2a and it is to be understood that brake band 236 simply maintains a constant drag on drum 235 to reduce chatter.

The connecting rod 180 for raising and lowering the elevator bars 169 is driven in timed relation with the sweep assemblies 202 and tray conveyor 183 by a cam 240 mounted on shaft 229, the lower end of connecting rod 180 being rigidly connected to a shaft 241 (FIGURE 3a) journaled in bearings 242 supported on lower side rail members 243 which connect the front and rear sets of legs 161. A follower lever arm 244a mounts a follower roller 244 which is in engagement with cam 240.

The chains 155 are driven continuously by a motor 245 so that the bread loaves B tend to group at the output ends of chains 155. Mounted on the output shaft 246 of motor 245 is a sprocket 247 which is connected with a sprocket 248 on shaft 164 by a chain 249.

The motor 206 is an intermittently operated motor which is started only when a bread stop member generally designated 250 (see FIGURE 3a) depresses the depressable button of a limit switch 251. As FIGURES 1a and 3a indicate, the bread stop 250 comprises a pair of bread engaging arms 252 fixed to a pivot post 253 journaled by a support plate 254, and a switch actuating arm 255 (FIGURE 1a) which is also fixed to the pin 253 and pivots toward the switch 251 when the arms 252 are pivoted by the bread.

A Gemco cam box 256 is mounted on the front end plate member 160 and is driven from the shaft 192 by a sprocket 257 which is connected with the cam shaft 258 of the cam box 256 by a chain 259 trained around the sprocket 260 provided thereon. The switch 251 is a normally open switch which, when closed, makes the circuit to the motor 206. Thus, when bread is in position against the stop 250, the conveyor chain 183 is driven to move a tray T forwardly into position to receive the bread. At the same time, the cam 261 in the Gemco switch box 256 moves with its shaft 258 and when the switch 262 is closed by the cam 261, the solenoid operated, single revolution clutch 263 is energized to release the shaft 229 to move through one revolution and advance one of the sweep members 202 through half of its endless path of travel to load the bread B from the conveyor rolls 182 to the tray T. If, for some reason, no bread B is in position against the bread stop arms 252, the circuit to motor 206 is never closed.

THE RACK LOADING APPARATUS

As noted previously, the conveyor 36 is a gravity roller conveyor which passes the loaded containers T to a powered conveyor 263 serving as an intake conveyor for the rack loading apparatus 37. As shown particularly in FIGURES 6b–8b, the conveyor 263 is a roll conveyor comprising rollers 264 journaled in side frame members 265, sprockets 266 being provided at one end of each roller 265 around which a drive chain 267 may be trained. A motor 268 continuously drives the chain 267 through a sprocket 269 connected with a sprocket 270 on the endmost roller 264 by a chain 271.

Figure 6B:
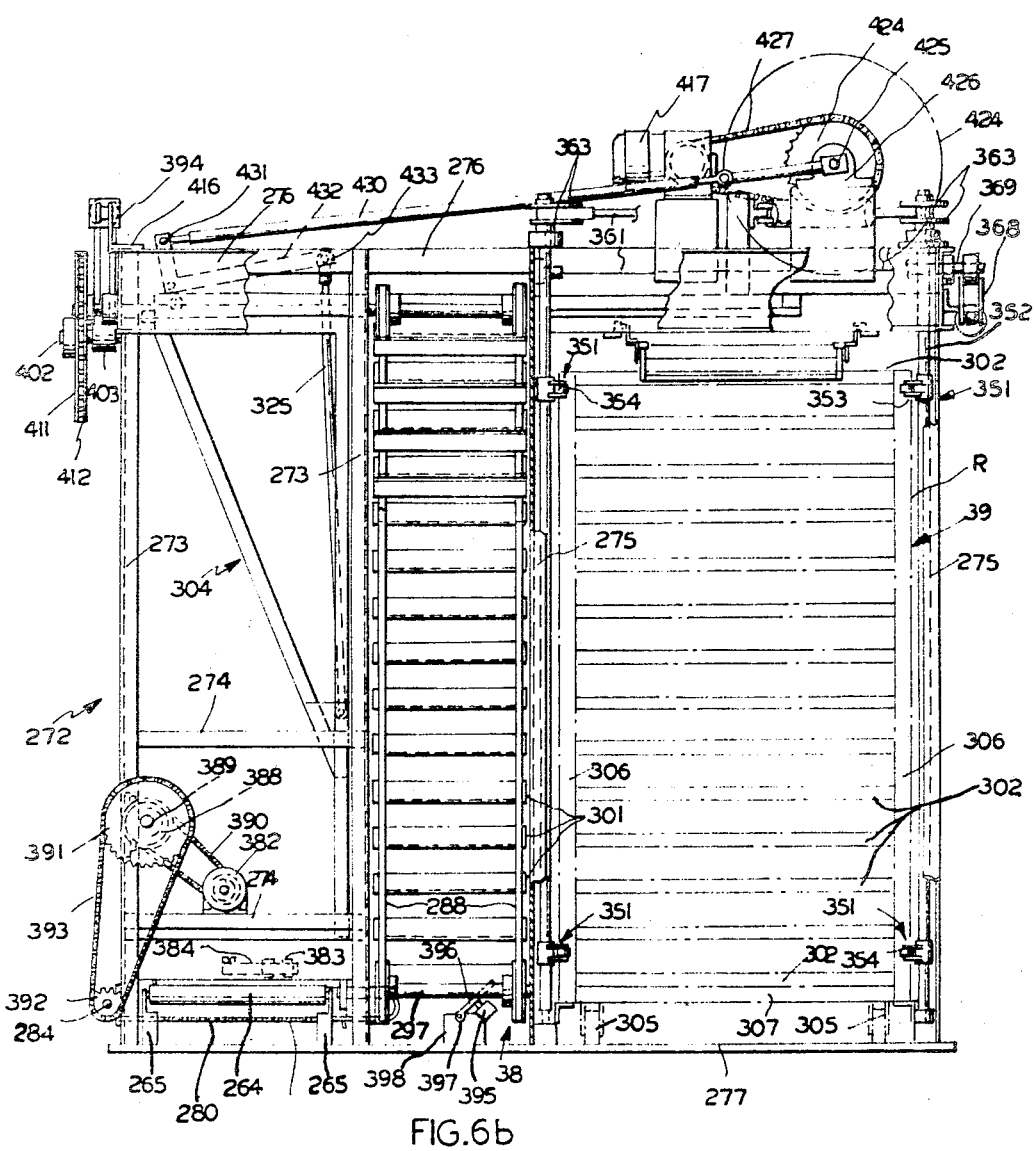
FIGURE 6b is a side elevational view of the rack loading apparatus showing a rack in chain lines in position adjacent the elevator ready to be loaded.

The side frame members 265 are secured to a skeleton framework for supporting the various operating elements of the rack loading machine which is generally designated 272 and which includes vertical rails 273 at the left end of the machine shown in FIGURE 6b joined by transverse brace rails 274. At the right end of the apparatus shown in FIGURE 6b, vertical rails 275 define the rack receiving area 39 for a rack R. Between the pairs of rails 273 and 275 is the rack loading elevator 38 and it will be noted that the rails 273 and 275 are connected at their upper end by channel rails 276. The whole framework 272 preferably is mounted on a platform 277. In addition, upper end channel rails 278 connect the rails 273, and upper side channel rails 278 connect the rails 275.

Figure 13B:
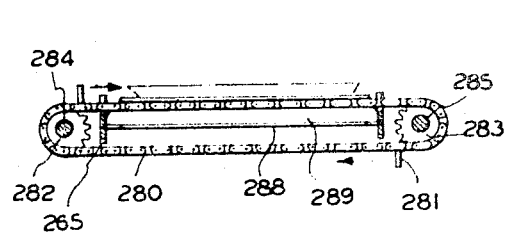
FIGURE 13b is an enlarged, fragmentary, side elevational view illustrating one of the conveyor chains for moving the bread carrying trays to the elevator mechanism.
Figure 13:
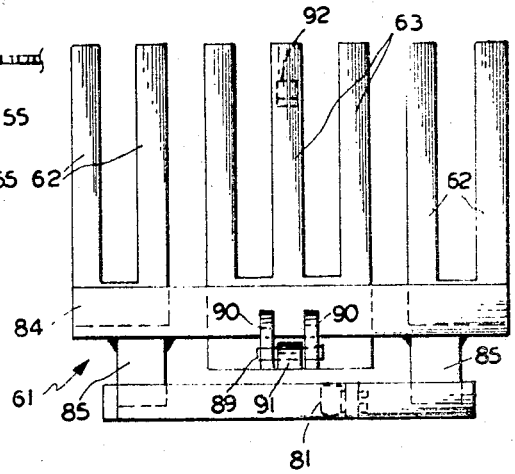
FIGURE 13 is an enlarged, fragmentary, sectional view taken on the line 13—13 of FIGURE 10.

As shown in FIGURES 8b and 13b particularly, a pair of endless chain conveyors 280 are mounted to extend transversely between the rolls 264 of the powered conveyor 263, the chains mounting flights 281 for conveying the loaded trays T from a position on the rollers 264 opposite the elevator 38 over to the elevator 38. The chains 280 are trained around sprockets 282 and 283 mounted on shafts 284 and 285 which are journaled by bearings 286 and 287 provided on the framework 272. Mounted on a cross support plate 288 (see FIGURE 13) to support the upper runs of the conveyor chains 280 are conveyor guides 289.

Figure 8:
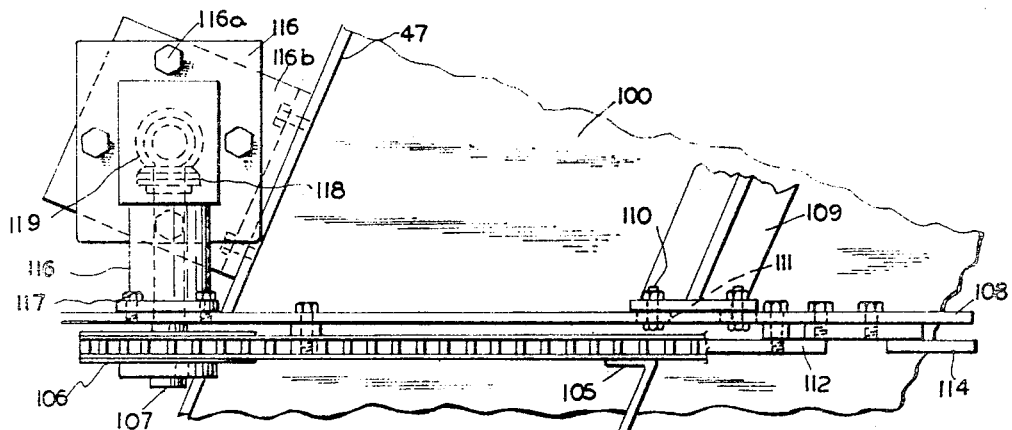
FIGURE 8 is a top plan view of the mechanism shown in FIGURE 7.
Figure 7:
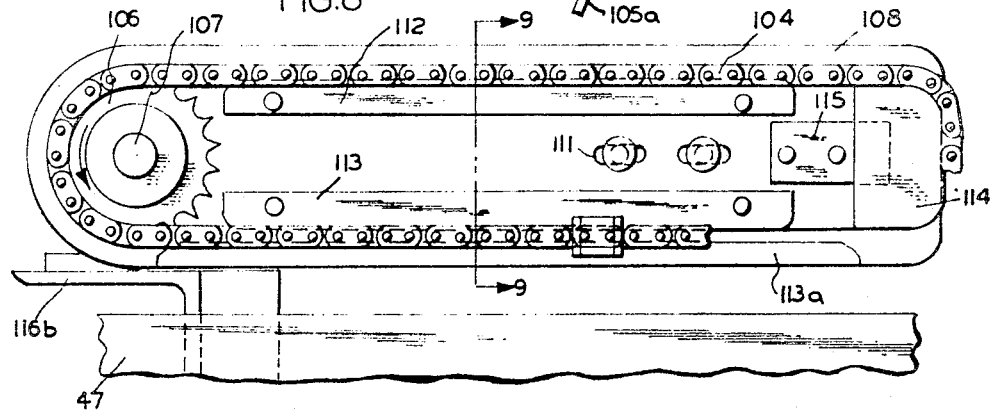
FIGURE 7 is an enlarged, fragmentary, sectional side elevational view taken on the line 7—7 of FIGURE 2.

As shown particularly in FIGURES 6b–8b, the elevator mechanism 38 comprises spaced apart pairs of vertically arranged, endless elevator chains 288 and 289, elevator chains 288 being trained around upper sprockets 290 and lower sprockets 291 fixed on shafts 292 and 293, respectively, and the chains 289 being trained around upper sprockets 294 and lower sprockets 295 fixed on shafts 296 and 297, respectively. Vertical channel members 298 (see FIGURE 7b) are provided for supporting the shafts 296 and 297 which may be journaled in bearing members 299. As indicated in FIGURES 7b and 8b particularly, the pair of chains 288 are connected by a series of vertically spaced angle members 300 which are horizontally aligned with a series of vertically spaced angle members 301 connecting the pair of chains 289. Together, each horizontally aligned pair of angle members 300 and 301 define what may be termed an elevator shelf and it is to be understood that these elevator shelves are spaced in conformance with the spacing of the vertically spaced angle members 302 and 303 which form the shelves of a rack member R (see FIGURES 6b and 14b). As noted previously, the conveyor chains 280 feed a single tray at a time to a single set of horizontally aligned elevator members 300 and 301 which then index upwardly one shelf space so that the immediately subjacent elevator members 300 and 301 are in position to receive the next container T of bread from the chains 280.

When all fourteen shelves have been loaded, a pusher mechanism generally indicated at 304 is operated to push all of the trays on the elevator simultaneously off the elevator shelves 300 and 301 and onto the rack shelves 302 and 303. The racks R comprise box-like skeleton frames mounted on wheels 305 and consist of corner vertical posts 306 connected at their sides by the angle members 302 and 303 and at their upper and lower ends by cross members 307 and 307a, thus leaving the ends of the racks completely open so that the bread containers may be received on the shelves 302 and 303 through the one end thereof.

Figure 9:
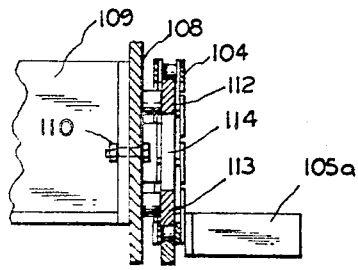
FIGURE 9 is a transverse sectional view taken on the line 9—9 of FIGURE 7.

The pusher frame 304 comprises side members 308 joined by a top member 309 and is mounted for forward and rearward travel in track guides 310 (see FIGURE 9b) extending between framework rails 278 and 279, the length of the rack loading mechanism. Angle members 311 fixed to the upper end of the pusher frame member 309 mount rollers 312 which are received within the tracks 313 of the guides 310. In addition, to aid in maintaining proper alignment, rollers 314 mounted on angles 315 joined to the angle members 311 engage inner edges of the guides 310, as shown in FIGURE 9. Braces 316 joined to the vertical rails 308 by gusset plates 317 aid in stabilizing the dependent pusher 304.

Telescopically carried by the main pusher frame 304 is a lowerable pusher subframe generally designated 318 which includes vertical side members 319. At their upper and lower ends the angle members 319 are connected by an upper rail 320 and a lower rail 321. Provided as a guide for the subframe 318 which lowers to move the container T from the lowermost pair of shelf members 300–301 is a cross brace 322. Except when the lowermost shelf has been loaded and the pusher 304 is to be operated, the subframe 318 is disposed in "up" position so that it does not interfere with bread containers T being fed across conveyor chains 280 to the elevator shelves. Connected with the pusher subframe assembly 318 by means of clevises 323 and a pin 324 is an operating rod 325 forming one element of an operating mechanism which will be later described.

Mechanism for moving a rack R from a ready position, as at 326 in FIGURE 1, into a position opposite the elevator mechanism 38 is particularly illustrated in FIGURES 11b and 12b. As shown in these figures, the mechanism includes a rectangular carriage generally designated 327 and made up of elongate members 328 joined at one end by a member 329. The carriage 327 includes supporting rollers 330 at each of its corners, riding on spaced apart rails 331 which connect to the upper front channel member 276 and to a rear channel member 332 which itself is joined to the rear upper channel support 276 by a channel support 333. Also connected between the support 332 and rear upper channel member 276 is a brace 334 supporting bearings 335 and 336 for shafts 337 and 338, respectively. Opposite end bearings 335 and 336 for the shafts 337 and 338 are supported on the frame member 279. Fixed on the inner ends of the shafts 337 and 338, respectively, are sprockets 339 and 340 for an endless drive chain 341 having an operating arm 342 connected to one of its links by a pin 343 and connected with the carriage 327 by a pin 344 mounted on lug 345. In addition to the rollers 330, rollers 346 are provided on the carriage rails 328 to engage the side walls of the rails 331 and assure proper alignment of the carriage 327.

Pivotally connected to the carriage as at 347 are a pair of U-shaped pusher bars 348 and 349. Stop lugs 350 on the rails 328 limit the clockwise swinging of the arms 348 and 349 so that the pusher arm 348 positively engages a rack R in the position 326 and the pusher 349 positively engages a rack R which has been filled and is to be moved out of the apparatus as the rack R' is shown being moved in FIGURE 12. On the return travel of carriage 327, the pusher bars 348 and 349 are free to swing counterclockwisely sufficiently to clear racks R in their path of rearward travel.

In order that the rack shelves may be properly loaded, it is necessary that the racks be in properly squared condition. In practice it has been found that the racks, although perhaps initially in perfect condition, with handling soon get out of alignment. Provided on the mechanism to insure their lateral alignment and return the corner support members 306 to a true vertical position are upper and lower clamp members generally designated 351 fixed on vertical shafts 352 mounted at the four corners of the rack accommodating area 39. As FIGURES 6b and 7b indicate, the rack engaging members 351 comprise clevis arms 353 mounting rollers 354 which are swingable clockwisely in FIGURE 7b from a position out of the path of travel of the racks R to a position in which they engage the corner posts 306 thereof and compress them to a plumb position. A pair of double-acting air cylinders 355 (see FIGURE 7b) pivotally connected as at 356 to brackets 357 joined to the front and rear channel members 276 are utilized to operate the clamp arm devices 351. The piston rods 358 of the cylinders 355 are pivotally joined as at 359 to pairs of plates 360 which are fixed to the shafts 352 at the outboard side of the apparatus. Connecting rods 361 are pivotally connected as at 362 to plate members 363 which are joined to the inboard shafts 352 and transmit a similar rotation to the inboard shafts 352.

To assure proper vertical alignment of the shelves 302 and 303 of the racks R, horizontally disposed elevator lift bars 364 (see FIGURES 14b and 15b) are provided which may be raised to lift the racks R into positive alignment with the elevator shelf members 300 and 301 and also assist in squaring the racks R. Lift bars 365 are connected to supports 366 joined to the horizontal elevator bars 364, and a double-acting air cylinder 367 is provided for raising the lift bars 365 in unison through linkage which includes arms 368 pivotally connected as at 369 to the piston rod 370 of the cylinder 367. The cylinder 367 is pivotally mounted as at 367a on a bracket 367b joined to channel 279. The arms 368 are fixed to a shaft 369 supported by bearings 370, and spaced apart arms 371 also fixed to shaft 369 are pivotally connected as at 372 to the front lift arms 365. The rear lift arms 365 are lifted by linkage comprising a connecting rod 373 pivotally connected between the arms 368 at 374 and pivotally connected as at 375 to an arm 376 which is rigidly connected with a shaft 377 journaled in bearings suitably provided on the framework. Spaced apart arms 378 also rigidly joined to the shafts 377 are pivotally joined to the rear lift arms 365 as at 379. As shown in FIGURE 15, upper and lower wear plate guide members 380 may be bolted to the members 275 as at 381.

A motor 382 is provided to drive the chains 280 when the depressable button of a limit switch 383 is actuated by a pan stop member 384 (see FIGURE 7b) which is pivotaly mounted as at 385 in the path of trays proceeding inwardly on the powered rollers 264. The armature shaft of motor 382 mounts a sprocket 386 which is connected with a sprocket 387 fixed on a stub shaft 388 journaled by bearings 389 by a chain 390. Mounted on the other end of shaft 388 is a drive sprocket 391 which is connected with a sprocket 392 fixed to the one end of the shaft 284 which drives chain conveyors 280. A solenoid released, single revolution clutch C' and chatter restraining brake band 388a are utilized in the same manner as previously.

As shown particularly in FIGURE 8b, the elevator chains 288 and 289 may be driven by a spring returned, single-acting air cylinder 394 actuated by a limit switch 395 (see FIGURE 6b) arranged to be depressed by an arm 396 in the path of a tray T being loaded onto the lowermost elevator shelves. The arm 396 may be pivotally mounted as at 397 on a support 398. The arm 396 projects upwardly only sufficiently to be depressed by a tray T and is easily cleared by the pusher subassembly 318 when it is in lowered position. As FIGURE 8b indicates, the piston rod 399 of cylinder 394 is pivotally connected as at 400 to an actuating arm 401 which is rigidly connected to a shaft 402 which is journaled by bearings 403 mounted on support brackets 404. A ratchet wheel 405 is fixed on the shaft 402 and is operated by a pawl 406 pivotally connected to the arm 401 as at 407. A spring 408 normally maintains the pawl 406 in the position in which it is shown in FIGURE 8b, the spring being connected to a lug 409 on the pawl 406 and to a lug 410 on the arm 401. Mounted on the outer end of the shaft 402 is a sprocket 411 which is connected with the elevator drive shafts 292 and 296 by a chain 412 trained around the sprockets 413 and 414 provided on the outer ends of shafts 292 and 296, respectively. The cylinder 394 may be pivotally mounted as at 415 on an angle member 416 fixed to upper end rail member 278.

The elevator unloader pusher 304 is operated by a motor 417 when a limit switch 418 (see FIGURE 8b) having a depressable button is depressed by an arm 419 disposed in the path of bread moving upwardly on the fourteenth shelf. The arm 419 and switch 418 may be supported by a bracket 420 from the frame, the arm being pivotally connected to the bracket 420 as at 421. Mounted on the armature shaft 422 of motor 417 is a sprocket 423 which is connected with a sprocket 424 on a shaft 425 journaled by bearings 426 by a chain 427. A crank arm 428 fixed to the shaft 425 is pivotally joined as at 429 to a connecting rod 430 which is pivotally joined as at 431 to a bell crank lever 432. As shown particularly in FIGURE 6b, the bell crank lever 432 is pivotally joined as at 433 to the upper end of actuating rod 325 and is responsible for raising and lowering the loader subframe 318.

To drive the rack moving carriage 327, a motor 434 is provided mounted on a platform 435, the motor having an armature shaft 436 with a sprocket 437 thereon connected with a sprocket 438 on shaft 338 by a chain 439. The motor 434 is operated after a suitable time delay by a limit switch 444 (FIGURE 11b) having a depressable button in the path of a swingable arm 440 which is pivotally mounted as at 441 on a bracket 442 supported from the framework. The arm 440 also depresses the button of a limit switch 443 which, as will later appear, may be utilized for operating air cylinders 355 and 367. In addition, a switch actuating arm 445 (FIGURE 11b) is provided in the path of the carriage 327, the arm 445 being pivotally mounted as at 446 to engage and depress the button on the limit switch 447.

THE ELECTRICAL CONTROL CIRCUIT

Figure 16B:
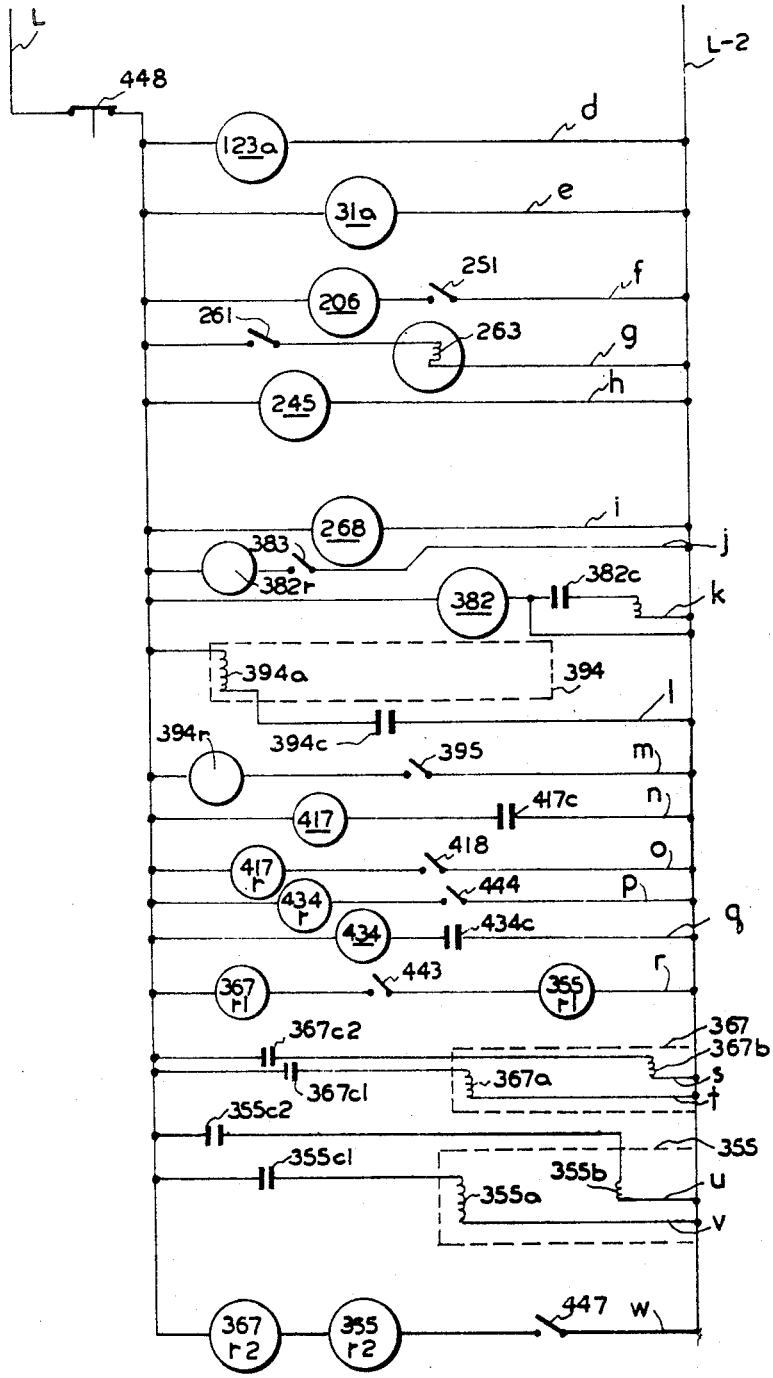
FIGURE 16b is a typical electrical control circuit for the system.

As shown particularly in FIGURE 16b, which is a schematic view illustrating only a typical electrical circuit, the various elements of the system may be rendered inoperative by an on-off switch 448 disposed in one of the lines $L_1$ or $L_2$ which connect to a suitable power source. The motor 123a for continuously driving the transfer units 27–29 and the conveyor 20 is shown in a circuit line d. The motor 31a for driving the conveyor 31 is shown in a circuit line e. Provided in circuit line f is the motor 206 for driving the various elements of the container loading machine when bread has closed the normally open limit switch 251. The Gemco cam box switch 261 and solenoid of the single revolution clutch 263 are connected in series in a circuit line g. Provided for the continuously driven motor 245 is a circuit line h and a circuit line i is provided for the continuously driven motor 268 which feeds the rack loading machine. A holding relay 382R is provided in a circuit line j in series with limit switch 383 and when its contacts 382C are held closed the motor 282 may be operated through the single revolution clutch C'. The relay 382R contacts 382C and solenoid of the clutch C' are all in a circuit line k.

The retract solenoid 394a of the single acting cylinder 394 which operates the elevator chains 288 and 289 is connected in a circuit line l in series with the contacts 394C of a holding relay 394. The relay 394R is connected in a circuit line m in series with limit switch 395. Connected in circuit line n is the motor 417 and the contacts 417C of a holding relay 417R which is connected in a circuit line o in series with limit switch 418. Holding relay 434R is connected in a circuit line p in series with limit switch 444, and the motor 434 is connected in a circuit line q in series with relay contacts 434C. In circuit line r two holding relays 367R–1 and 355R–1 are connected in series with a limit switch 443. Circuit line s has the relay contacts 367C–2 and the advance solenoid 367b of the double-acting cylinder 367, and circuit line t has the retract solenoid 367a of cylinder 367 in series with relay contacts 367C–1. Circuit line u has the relay contacts 355C–2 in series with the retract solenoids 355B of each of the cylinders 355, only the one cylinder 355 being shown, however, for the sake of convenience. Finally, circuit line v has the advance solenoid 355a of each of the air cylinders 355 in series with contacts 355C–1, and circuit line w has holding relays 367R–2 and 355R–2 in series with the limit switch 447.

THE OVERALL OPERATION

In operation the units 27–29 feed bread loaves B to the stations b, c, and a, respectively, on conveyor surface 30 as the surface 30 moves continuously toward the continuously operated conveyor 31, and provide a sufficient quantity of bread loaves B to the container loading machine 32 to enable it to be operated at the desired capacity. It is anticipated that the system will be able to process something in the neighborhood of 200 loaves per minute.

When the bread loaves from conveyor 31 reach the container loading machine 32 they are fed inwardly by the continuously driven chains 155 during the period when the elevator bars 169 are in the lowered position in which they are shown in FIGURE 6a. As FIGURES 6a and 7a indicate, the chains 155 tend to group the loaves and when five loaves have been moved onto the roller platform 162 and bread stop member 250 is actuated to make limit switch 251, motor 206 is started and chains 183 are operated to move an empty tray T, which has moved into position from the gravity conveyor 194, forwardly between the guides 186 and 187. At this time the cam 240 raises connecting rod 180 and moves the elevator bars 169 upwardly to the position in which they are shown in FIGURE 7a so that following loaves of bread B are moved upwardly out of engagement with the advancing chains 155. During the time that chain 183 is advancing the empty tray T, the Gemco cam box shaft 258 is also being operated and, after a predetermined time, switch 261 is closed and the solenoid of single revolution clutch 263 is energized to release the shaft 198. This permits a sweep bar 205 to move forwardly to sweep the group of five loaves off the roller platform 162 into the tray T which has by this time proceeded under and forwardly of the platform 162 into position to receive a first group of five loaves. The cam 240 then lowers the elevator bars 169 to permit the cycle to be repeated so that a second group of five loaves is loaded into the same tray T which contains a total of ten loaves as it is discharged to the conveyor 36.

Figure 2B:
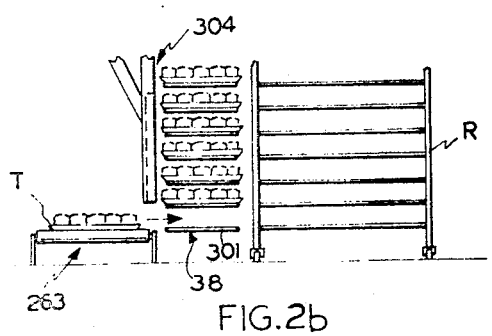
FIGURE 2b is a schematic side elevational view illustrating the manner in which the rack loading elevator mechanism is itself loaded.

When the trays T are received on the powered rolls 264 of the rack loading machine 37, they proceed across to engage the tray stop arm 384 and close the limit switch 383 in circuit line *j*. This energizes the holding relay 382R which has contacts 382C in the circuit line *k* and energizes the solenoid of the single revolution clutch C' to release the shaft 388 and thereby the shaft 284 driving chains 280 which move the tray T over to the bottom set of elevator shelves 300–301. This step in the loading process is illustrated in FIGURE 2*b*, wherein the tray T on the roller conveyor 263 is shown in readiness to be transferred across to the lowermost shelves of an elevator 38 which has superadjacent shelves which have already been loaded. The relay contacts 382C are held closed long enough for this transfer to occur and, when the tray T has been moved over to the lowermost elevator shelves 300–301, limit switch 395 (see FIGURE 6*b*) is closed by the arm 396 to energize relay 394R which has contacts 394C in circuit line *l* in series with the retract solenoid 394a of elevator operating cylinder 394. The holding relay 394R holds the contacts 394C closed for a sufficient length of time for the cylinder 394 to index the elevator chains 288 and 299 upwardly one shelf.

The cycle of the rack loading machine described thus far is repeated until, in the present instance, a total of fourteen shelves have been loaded with trays T, and at this point limit switch 418 (FIGURE 8*b*) is closed by the actuating arm 419 and relay 417R in circuit line *o* is energized. The holding relay 417R holds its contacts 417C closed for a sufficient period of time for the pusher operating motor 417 to move crank arm 428 upwardly to the position shown in chain lines in FIGURE 10*b*, which moves pusher subframe 318 downwardly to the position in which it is shown in chain lines in FIGURES 9*b* and 10*b* and in solid lines in FIGURE 3*b* opposite the lowermost elevator shelf. Continued movement of the crank arm 428 clockwisely, as shown in FIGURE 10*b*, pulls the entire pusher assembly 304 forwardly, inasmuch as the angle member 320 engages with the guide stop 322 when the subframe 318 is lowered and prevents further downward movement of pusher subframe 318, to sweep all of the trays T from the elevator 38 over to the shelves 301–302 of the rack R, as shown in FIGURE 3*b*.

Figure 4B:
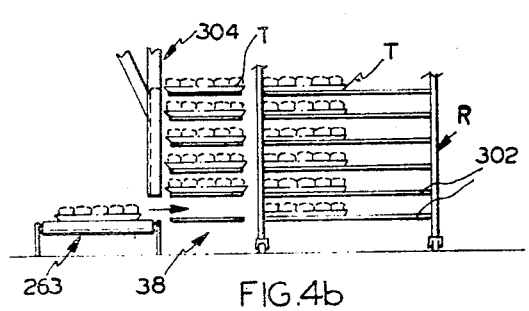
FIGURE 4b illustrates the manner in which an additional container or tray of bread loaves is then loaded on the elevator.
Figure 4A:
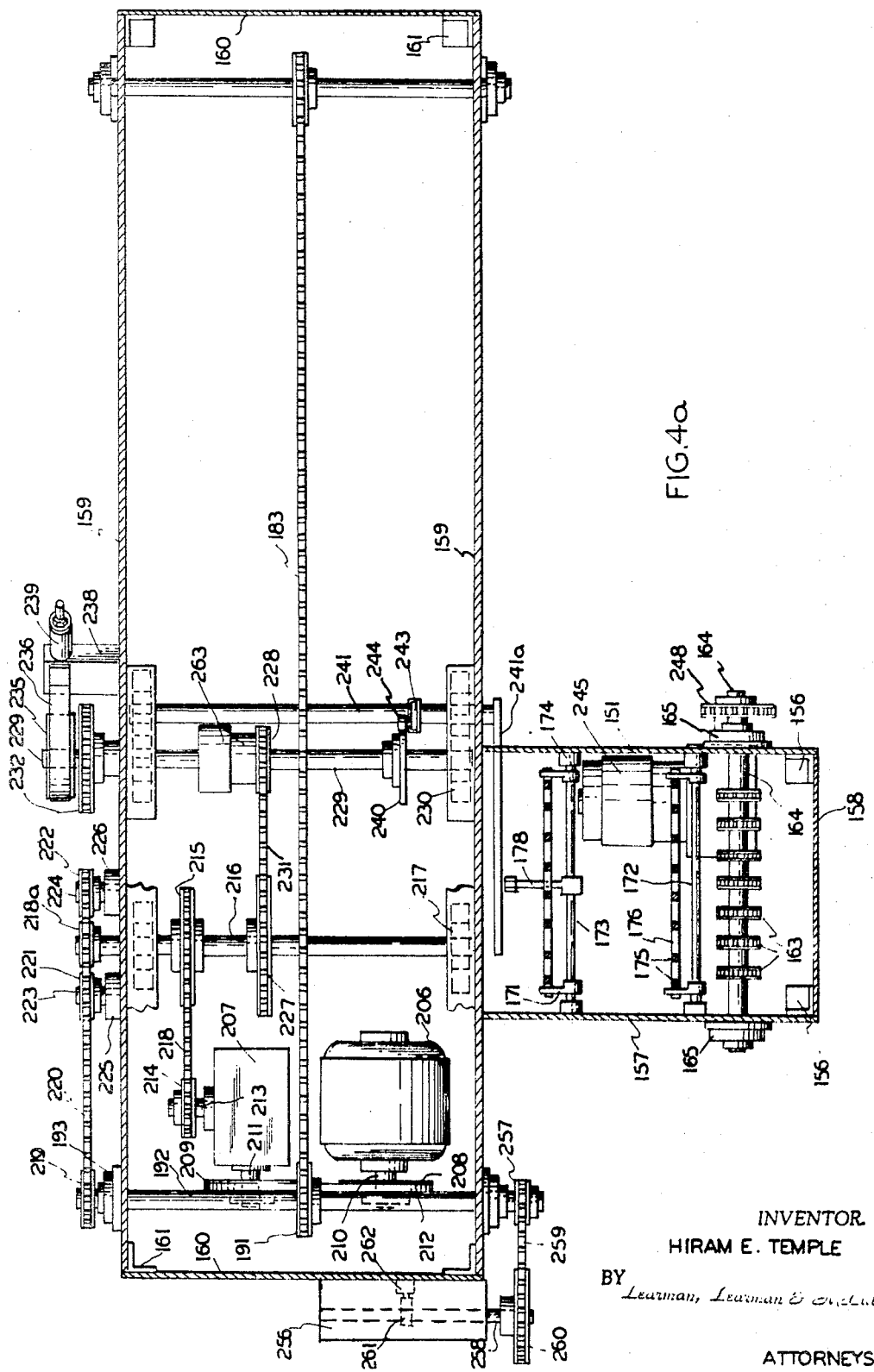

The motor 417 is operative for a sufficient period of time to return the pusher 304 back to original position and to retract the lowermost shelf clearing pusher subframe 318. At this time the elevator 38 is again filled with trays T in the manner indicated in FIGURE 4*b* and when the fourteenth tray T again closes limit switch 418 the pusher 304 is again actuated, as shown in FIGURE 4*b*, to again move the trays in the filled elevator over to the trays of rack R. To do this, the trays T which have been loaded on the rack R in the position shown in FIGURE 3*b* must be pushed across to the other end of the rack R by the trays T being loaded, in the manner illustrated in FIGURE 5*b*.

Once the trays T have been loaded in FIGURE 5*b*, a limit switch 443 is closed by the trays T moving to the right end of the rack R in FIGURE 5*b* to energize holding relays 367R–1 and 355R–1. Relays 367R–1 has contacts 367C–1 in a circuit line *t* which are held closed to energize the retract solenoid 367a of air cylinder 367 and resolve the shafts 352 in a direction to release the rack clamping devices 351. At the same time, relay 355R–1 holds its contacts 355C–1 closed for a sufficient period of time to energize the advance solenoid 355a of each cylinder 355 and revolve shafts 369 and 377 in a direction to lower lift rods 365 and thereby release the rack R from the elevator bars 364.

At the same time that limit switch 443 was made to release the rack aligning members, a limit switch 444 was made to energize a time delay holding relay 434R. The contacts 334C of relay 434R are delayed in closing for a sufficient period of time for the air cylinders 367 and 355 to be operated in the manner indicated to release the rack R and once this has occurred are held closed to operate the motor 434 which moves the carriage 327 forwardly from the position in which it is shown in FIGURE 12*b*. This has the effect of moving the loaded and now freed rack R from the loading position at 39 to the position R' in FIGURE 12*b* and replacing it with a rack R from the ready position 326 in FIGURE 1. The motor 434 is held closed for a sufficient period of time that the reciprocating carriage 327 is returned to the position in which it is shown in FIGURE 12*b* and in so doing it closes a limit switch 447 in circuit line *w* which energzes relays 367R–2 and 355R–2. The relay 367R–2 has its contacts 367C–2 in circuit line *s* and, when closed, energizes the advance solenoid 367b of cylinder 367 so that shafts 352 are revolved in a direction to pivot the lateral squaring clamp arms 351 into engagement with the corner members 306 of the empty rack which has been supplied to the loading area. At the same time, the contacts 355C–2 in circuit line *u* are closed and the retract solenoid 355b of each cylinder 355 is energized so that shafts 369 and 377 are pivoted in a direction to raise lift bars 365 and move the elevator bars 364 upwardly sufficiently to raise the rack R into position so that the shelves of the rack R are in proper vertical alignment with the elevator shelves. During this time, the elevator 38 is being again filled with trays T and the cycle is, of course, repeated automatically over and over as long as the switch 448 remains closed.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a product handling system: a battery of transfer units for delivering the product from a group of processing machines such as bread packaging machines; traveling conveyor means, providing a plurality of receiving stations thereon arranged in a line, and receiving products from said units at different ones of said receiving stations along said conveyor means; means, incorporated with each of said transfer units, and timed with the travel of said conveyor means to deliver products to unoccupied stations only; means receiving said products and packing them in groups in containers receiving a plurality of products; and means communicating with said latter means for vertically stacking said containers for transport.

2. The combination defined in claim 1 in which said means for stacking said containers includes elevator means for loading the containers into racks having vertically spaced shelves.

3. The combination defined in claim 1 in which each transfer unit includes conveyor elements moving said products in a path inclined to said conveyor means in the direction of travel thereof and having a longitudinal and lateral component.

4. The combination defined in claim 3 in which said elements comprise a vertically disposed endless conveyor extending at an angle to said conveyor means to push a product forwardly and laterally toward a station on said conveyor means, and a sweep member moving a product forwardly into the path of said endless conveyor and cooperating with the endless conveyor to deliver the product to the conveyor means.

5. In a product handling system: a battery of transfer means for delivering the product from a group of processing machines such as bread packaging machines; traveling conveyor means, providing a plurality of receiving stations thereon arranged in a line, and receiving products from said means at different one of said receiving stations along said conveyor means; sweep means for each of said transfer means operable in timed relation with the travel of said conveyor means to deliver products to unoccupied stations only; and means receiving said products and packing a plurality of them in a predetermined arrangement in containers.

6. The combination defined in claim 5 in which each transfer means includes a product support surface; and said sweep means includes endless conveyor means with sweep members thereon disposed above said support surface to move products along said support surface to a station on said traveling conveyor means.

7. The combination defined in claim 5 in which means for vertically stacking the containers communicates with said means for packing the products in containers.

8. The combination defined in claim 5 in which said means receiving said products and packing them includes a traveling container conveyor; means for feeding containers to said conveyor; a support surface arranged above said traveling container conveyor for receiving products from said traveling conveyor means; and sweep means above said container conveyor for moving products on said support surface along and off said surface to deposit them in said containers.

9. A method of handling packaged bread loaves comprising: feeding them from a battery of broadside packaging machine delivery units to different unoccupied in line receiving stations on a traveling conveyor while the conveyor is moving forwardly to move said stations past the delivery units; loading said loaves into containers; and vertically arranging said containers in supported relation for transport.

10. In a product handling system: a plurality of transfer means for delivering the product from a group of processing machines such as bread packaging machines; traveling conveyor means, providing a plurality of receiving stations thereon arranged in a line, and receiving products from said plurality of transfer means at different ones of said receiving stations along said conveyor means; sweep means for each of said transfer means timed with the travel of said conveyor means to deliver products to unoccupied stations only; a container conveyor; a support surface arranged above said container conveyor for receiving product groups from said traveling conveyor means; and means for moving product groups on said support surface off said surface to deposit them in containers on the container conveyor.

11. The combination defined in claim 10 including electrical circuit means; means connected therein for normally driving the traveling conveyor means continuously; means connected in said electric circuit means for driving said container conveyor intermittently through increments gauged by the length of a container in the direction of travel of the container conveyor and the number of loaves to be loaded lengthwisely therein; and means sensing when a predetermined grouping of loaves is in position on said support surface and operating the container conveyor to move it forwardly an increment.

12. In a product handling system: a battery of transfer means for delivering the product from a group of processing machines such as bread packaging machines; electrical circuit means; traveling conveyor means, providing a plurality of receiving stations thereon arranged in a line, and receiving products from said means at different ones of said receiving stations along said conveyor means; means connected in said electrical circuit means for normally driving the traveling conveyor means continuously; means for each of said transfer means timed with the travel of said conveyor means to deliver products to unoccupied stations only; a container conveyor; means connected in said electrical circuit means for driving the container conveyor intermittently in increments of advance gauge by the length of the container in the direction of advance of the container conveyor and the number of loaves to be loaded lengthwisely therein; a support surface arranged above said traveling container conveyor for receiving product groups from said traveling conveyor means; and intermittently operated means above said support surface and connected in said circuit means for moving product groups on said support surface along and off said surface to deposit them in containers on the container conveyor.

References Cited

UNITED STATES PATENTS

| | | | |
|---|---|---|---|
| 1,779,210 | 10/1930 | Davis | 214—16.6 |
| 2,603,340 | 7/1952 | Warren et al. | 53—154 XR |
| 3,290,859 | 12/1966 | Talbot | 53—250 XR |

TRAVIS S. McGEHEE, Primary Examiner

U.S. Cl. X.R.

53—61, 154, 160, 251; 198—34; 214—6